US006914239B2

(12) United States Patent
Yoshinari et al.

(10) Patent No.: US 6,914,239 B2
(45) Date of Patent: Jul. 5, 2005

(54) SYSTEM FOR ANALYZING MASS SPECTROMETRIC DATA

(75) Inventors: Kiyomi Yoshinari, Tokyo (JP); Kinya Kobayashi, Tokyo (JP); Atsushi Otake, Tokyo (JP); Toyoharu Okumoto, Ibaraki (JP)

(73) Assignees: Hitachi, Ltd., Tokyo (JP); Hitachi High-Technologies Corporation, Tokyo (JP)

(*) Notice: Subject to any disclaimer, the term of this patent is extended or adjusted under 35 U.S.C. 154(b) by 64 days.

(21) Appl. No.: 10/705,612

(22) Filed: Nov. 10, 2003

(65) Prior Publication Data

US 2004/0181347 A1 Sep. 16, 2004

(30) Foreign Application Priority Data

Feb. 14, 2003 (JP) ....................................... 2003-035928

(51) Int. Cl.[7] ........................... G06F 19/00; H01J 49/00

(52) U.S. Cl. ....................... 250/281; 250/282; 250/286; 702/27

(58) Field of Search ................................ 250/281, 282, 250/286; 702/27

(56) References Cited

U.S. PATENT DOCUMENTS

2004/0108452 A1 * 6/2004 Graber et al. ............... 250/281
2004/0111228 A1 * 6/2004 Kobayashi et al. ........... 702/81

FOREIGN PATENT DOCUMENTS

JP 08-124519 5/1996

OTHER PUBLICATIONS

Jorge Fernandez–de–Cossio et al., "Automated Interpretation of High–energy Collision–induced Dissociation Spectra of Singly Protonated Peptides by "SeqMS", a Software Aid for *De Novo* Sequencing by Tandem Mass Spectrometry", Rapid Commun. Mass Spectrom. 12, 1867–1878 (1998) pp. 1867–1878.

* cited by examiner

*Primary Examiner*—Nikita Wells
(74) *Attorney, Agent, or Firm*—Hogan & Hartson, LLP

(57) ABSTRACT

A system for analyzing mass spectrometric data is provided, which has an data input means for entering mass spectrometric data of a parent ion and dissociated ions resulting from multiple dissociation of the parent ion, and an analytical means for providing characteristics of a candidate for estimated structure of a precursor ion that is representative of pre-dissociation structure at each stage of dissociation. The system analyzes one of the structure of precursor ion at each stage of dissociation and the structure of parent ion based on the characteristics and spectrometric data.

19 Claims, 24 Drawing Sheets

FIG. 7

| Rank | Estimated amino acid sequences (N-terminal← →C-terminal) | | | | | | |
|---|---|---|---|---|---|---|---|
| 1 | Arg | Tyr | Val | Leu | His | Met | Leu |
| 2 | Arg | Tyr | Val | Leu | His | Met | Leu |
| 3 | Arg | Tyr | Val | Ile | His | Met | Leu |
| 4 | Arg | Tyr | Val | Leu | His | Met | Ile |
| 5 | Arg | Tyr | Val | Ile | His | Met | Ile |
| 6 | Arg | Tyr | Val | Ile | His | Met | Ile |
| 7 | Arg | Val | Tyr | Ile | His | Met | Leu |
| 8 | Arg | Val | Tyr | Leu | His | Met | Ile |
| 9 | Arg | Val | Tyr | Leu | His | Met | Leu |
| 10 | Arg | Val | Tyr | Leu | His | Met | Leu |
| 11 | Arg | Val | Tyr | Ile | His | Met | Ile |
| 12 | Arg | Val | Tyr | Ile | His | Met | Ile |
| 13 | Arg | Tyr | Val | Leu | His | Asp | Glu |
| 14 | Arg | Tyr | Val | Ile | His | Asp | Glu |
| 15 | Arg | Tyr | Val | Leu | His | Pro | Phe |
| 16 | Arg | Tyr | Val | Ile | His | Pro | Phe |
| 17 | Arg | Val | Tyr | Leu | His | Asp | Glu |
| 18 | Arg | Val | Tyr | Ile | His | Asp | Glu |
| 19 | Arg | Val | Tyr | Leu | His | Pro | Phe |
| 20 | Arg | Val | Tyr | Ile | His | Pro | Phe |

FIG. 8

| Rank | Estimated amino acid sequences (N-terminal← →C-terminal) | | | | | | | Ranking resulting from the method of invention |
|---|---|---|---|---|---|---|---|---|
| 1 | Arg | Tyr | Val | Leu | His | Met | Leu | 6 |
| 2 | Arg | Tyr | Val | Leu | His | Met | Leu | 7 |
| 3 | Arg | Tyr | Val | Ile | His | Met | Leu | 13 |
| 4 | Arg | Tyr | Val | Leu | His | Met | Ile | 8 |
| 5 | Arg | Tyr | Val | Ile | His | Met | Ile | 19 |
| 6 | Arg | Tyr | Val | Ile | His | Met | Ile | 20 |
| 7 | Arg | Val | Tyr | Ile | His | Met | Leu | 12 |
| 8 | Arg | Val | Tyr | Leu | His | Met | Ile | 5 |
| 9 | Arg | Val | Tyr | Leu | His | Met | Leu | 3 |
| 10 | Arg | Val | Tyr | Leu | His | Met | Leu | 4 |
| 11 | Arg | Val | Tyr | Ile | His | Met | Ile | 17 |
| 12 | Arg | Val | Tyr | Ile | His | Met | Ile | 18 |
| 13 | Arg | Tyr | Val | Leu | His | Asp | Glu | 16 |
| 14 | Arg | Tyr | Val | Ile | His | Asp | Glu | 14 |
| 15 | Arg | Tyr | Val | Leu | His | Pro | Phe | 10 |
| 16 | Arg | Tyr | Val | Ile | His | Pro | Phe | 2 |
| 17 | Arg | Val | Tyr | Leu | His | Asp | Glu | 15 |
| 18 | Arg | Val | Tyr | Ile | His | Asp | Glu | 11 |
| 19 | Arg | Val | Tyr | Leu | His | Pro | Phe | 9 |
| 20 | Arg | Val | Tyr | Ile | His | Pro | Phe | 1 |

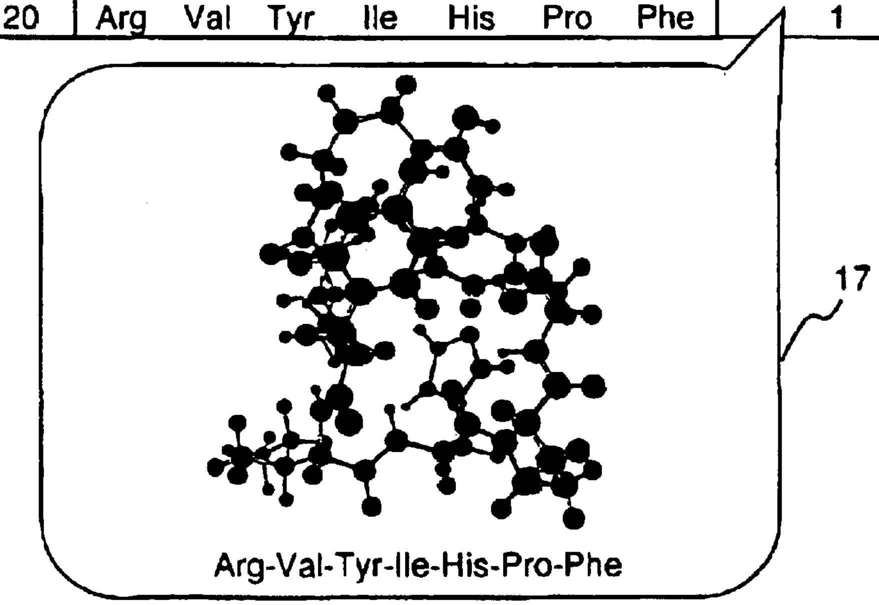

DECOMPOSING REACTION OF RECERPINE

Arg-Val-Tyr-Ile-His-Pro-Phe

Three-dimensional displaying of the structure of a protein including the predicted amino acid sequence

FIG. 27

Combination of a single amino acid and a pair of amino acids having the same or close mass number

| 1 Single amino acid | | 2 A pair of amino acids | Difference of mass number |
|---|---|---|---|
| Trp | (186.213) , | Glu-Gly (186168) | Δm=0.0458 |
| Trp | (186.213) , | Ala-Asp (186.168) | Δm=0.0458 |
| Trp | (186.213) , | Ser-Val (186.211) | Δm=0.0024 |
| Trp | (186.213) , | Lys-Gly (185.226) | Δm=0.9872 |
| Trp | (186.213) , | Gln-Gly (185.183) | Δm=1.0305 |
| Trp | (186.213) , | Asn-Ala (185.183) | Δm=1.0305 |
| Asn | (114.104) , | Gly-Gly (114.104) | Δm=0 |
| Lys | (128.174) , | Gly-Ala (128.131) | Δm=0.0434 |
| Gln | (128.131) , | Gly-Ala (128.131) | Δm=0 |
| Arg | (156.188) , | Val-Gly (156.185) | Δm=0.0031 |
| Glu | (129.116) , | Gly-Ala (128.131) | Δm=0.9847 |

$|\Delta m| < 1.0$ ( ):Mass number without N and C terminals

SYSTEM FOR ANALYZING MASS SPECTROMETRIC DATA

FIELD OF THE INVENTION

The present invention relates to a system for analyzing mass spectrometric data, a system for analyzing structure of a compound and a computer program executing a computer for the system.

BACKGROUND OF THE INVENTION

A spectrometer having a function of tandem mass spectrometry has prevailed recently, which analyzes a sample (a parent ion) after the first dissociation and continues mass spectrometry for dissociated ions after the second or more dissociation. An objective for utilizing a tandem mass spectrometer is to improve the accuracy of identifying a sample by analyzing mass spectrometric data obtained by a mass spectrometer. An analysis of multiple-stage dissociation, which analyzes mass spectrometric data of a parent ion (MS data), another mass spectrometric data (MS.sup.2 data) of dissociated ions of the parent ion and the other mass spectrometric data (MS.sup.3) obtained by further dissociating the dissociated ions, can improve the accuracy of estimation for structure of the parent ion.

Methods for providing the estimated structure of a parent ion, which use mass spectrometric data, are categorized as follows:

(1) method for retrieving a database of mass spectrometric data for a parent ion (MS data)

(2) method for retrieving a database of mass spectrometric data for a parent ion and dissociated ions thereof (MS data and MS.sup.2 data)

(3) method for employing measured mass spectrometric data for a parent ion and dissociated ions thereof (MS data and MS.sup.2 data) but not utilizing database search As an example of the conventional method (2), the Japanese Published Patent Application 8-124519 discloses a method for determining a candidate for parent ion. The method has the steps of picking up candidates for an ion species, which have peaks correlating respectively with those of mass spectrum of the ion species, referring to a database of peaks; picking up candidates for a desorptive base which have desorptive masses correlating with those of the ion species, referring to a database of desorptive bases; and determining a candidate for the parent ion referring to a database which stores regulations applied to construction of the parent ion from dissociated ions and desorptive bases. It is noted that a tandem mass spectrometric data includes up to MS.sup.2 but not MS.sup.3 or more.

Also as an example of the conventional method (3), there is a computer program called “SeqMS” for supporting an analysis for amino acid sequence developed by Osaka University in Japan, which is reported in Lectures on Experiment in Proteome Analysis Method P137 to P139. The computer program is able to support in identifying amino acid sequences for a peptide without database search, which includes about ten amino acid sequences. The method applied to the program, which employs a statistical processing that takes into account a weighted value of dissociation probability empirically obtained from the mass spectrometric data of a peptide ion and its dissociated ions, provides candidates for the amino acid sequence.

If a mass spectrometer is able to perform mass spectrometry MS.sup.N (N equal to or grater than 3), it is impossible to analyze the obtained mass spectrometric data by database search shown in the above-mentioned conventional methods (1) and (2) since the data base does not cover mass spectrometric data for MS.sup.N (N≧3).

It is also difficult for the method (3), which does not use database search, to improve the accuracy of identifying a parent ion. The reason for it is that the empirical weighting of dissociation probability can not be applied to the mass spectrometric data MS.sup.N (N≧3).

SUMMARY OF THE INVENTION

The object of the present invention is to make it feasible to identify a parent ion or estimate structure thereof accurately, by utilizing mass spectrometric data MS.sup.N (N≧3) for which a database is not available.

The present invention is able not only to provide structure of a parent ion and dissociated ions accurately but also to display it by executing molecular orbital analysis and molecular dynamic calculation for mass spectrometric data (MS data, MS.sup.2 data and MS.sup.N data N≧3), which is obtained by multiple-stage dissociation of the parent ion.

BRIEF DESCRIPTION OF THE DRAWINGS

FIG. 7 is a table showing candidates of amino acid sequence ranked higher by way of a conventional method.

FIG. 8 is a table showing a new ranking as a result of analyzing candidates of amino acid sequence in FIG. 7 by molecular orbital analysis.

FIG. 27 is a diagram showing a single amino acid and a pair of amino acids which have similar mass numbers.

DESCRIPTION OF THE PREFERRED EMBODIMENTS

Embodiments of the present invention are now described referring to the accompanying drawings.

Figure 1:
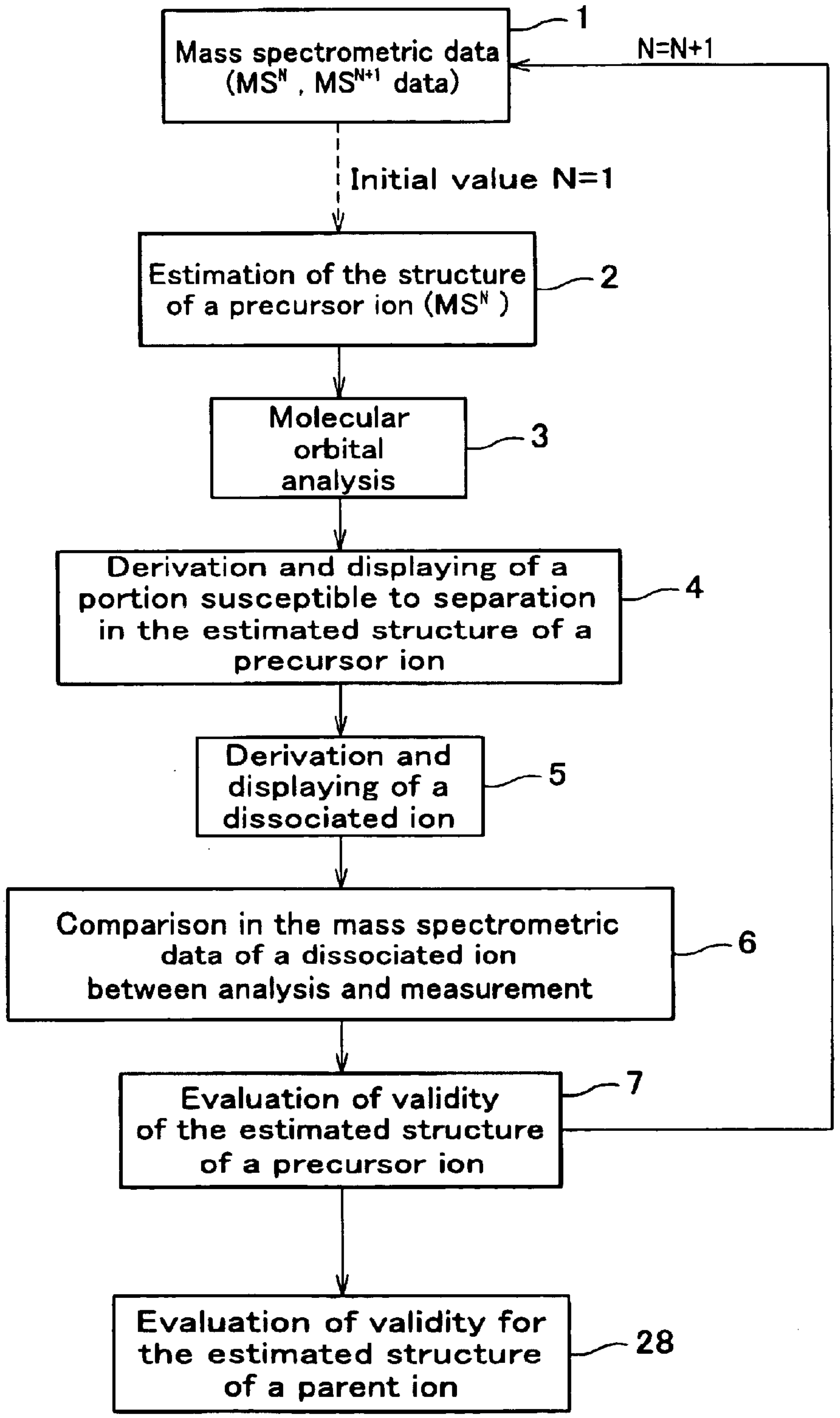
FIG. 1 is a flow diagram showing a method of analyzing mass spectrometric data according to a first embodiment.
Figure 2:
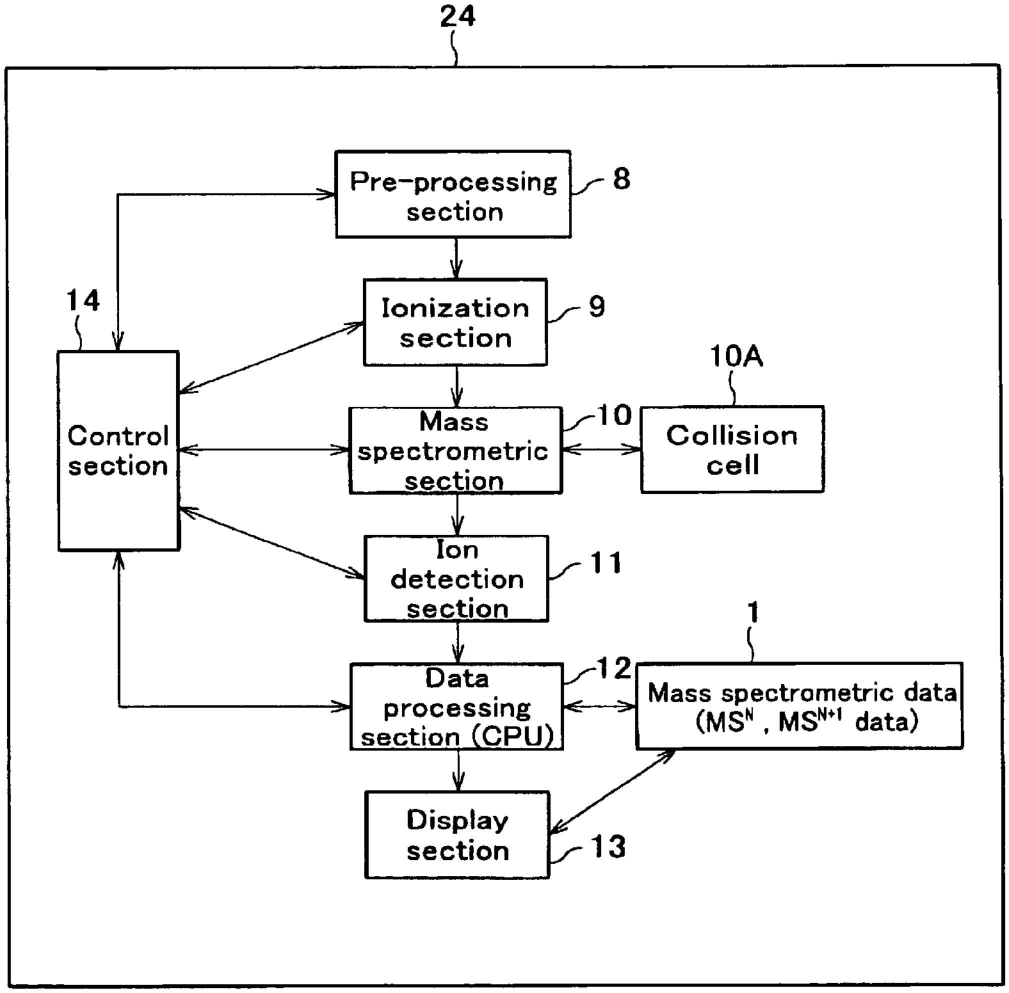
FIG. 2 is a schematic diagram illustrating an apparatus for mass spectrometry according to a first embodiment.

A first embodiment of the present invention is described. FIG. 1 is a general flow chart showing a flow for analysis of mass spectrometric data according to the first embodiment. Mass spectrometric data 1 is obtained by measurement with an apparatus 24 for mass spectrometry shown in FIG. 2. In the apparatus 24, a sample to be analyzed undergoes preprocessing by a pre-processing section 8 such as a liquid chromatograph and is ionized in an ionization section 9, being separated in a mass spectrometric section 10 according to the mass to charge ratios m/Z of ions. The symbols represent; m for ion mass and Z for charge number. The separated ion is detected by an ion detection section 11, the data of which is reduced and processed in a data processing section 12. Result of analysis, the mass spectrometric data 1, is displayed on a display section 13. A control section 14 controls a sequence of mass spectrometry, which ranges over ionization of a sample, transferring and entering the ion beam of sample in the mass spectrometric section 10, execution of mass separation, detection of ion and processing of data.

Mass spectrometry is categorized into two methods generally. One is called MS method, which analyzes an ionized sample directly. The other method called tandem mass spectrometry analyzes dissociated ions produced by dissociating a specific sample ion (a parent ion) selected according to the masses. Tandem mass spectrometry has a function of multiple-stage dissociation and mass spectrometry (MS.sup.N), in which a precursor ion having a specific mass to charge ratio is selected out of dissociated ions and mass spectrometry is conducted for further dissociated ions produced by dissociating the precursor ion. An example of steps for tandem mass spectrometry is described as follows: measuring mass spectrometric data for a parent ion (MS.sup.1); dissociating the parent ion and measuring mass spectrometric data for dissociated ions (MS.sup.2); further dissociating a precursor ion selected out of the MS.sup.2 data and measuring mass spectrometric data for further dissociated ions (MS.sup.3); and continuing dissociation and mass spectrometry in the same manner (MS.sup.N N≧3). Since this method is able to obtain the information on molecular structure of a precursor ion representative of pre-dissociation status at each stage of dissociation, it provides an efficient tool for estimating structure of the precursor ion. The more detailed the information is, the better the accuracy of estimation will be.

Method for dissociating a precursor ion is categorized into two types: one is Collision Induced Dissociation (CID) in which dissociation of an ion is made by collision with a buffer gas such as helium gas and the other is photo dissociation method with irradiation of light. The present embodiment is described using collision induced dissociation as an example. A collision cell 10A shown in FIG. 2, which is required for a neutral gas such as helium gas for causing collision induced dissociation, is sometimes separated from the mass spectrometric section 10. It may also be possible to cause collision induced dissociation within the mass spectrometric section 10 by filling a neutral gas therein. In this case the collision cell 10A can be obviated.

Figure 3:
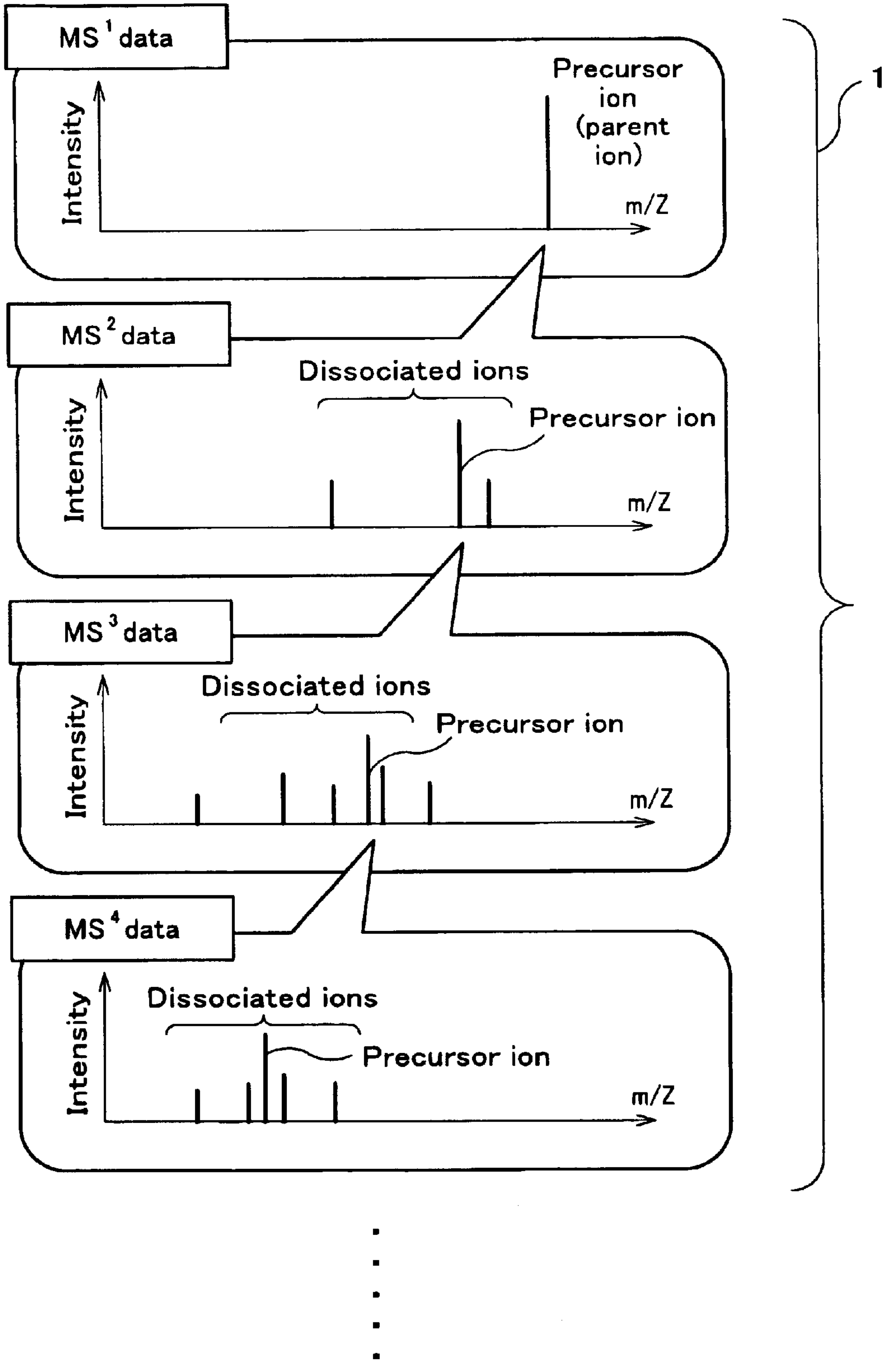
FIG. 3 is a diagram illustrating an example of mass spectrometric data with multiple-stage dissociation.

FIG. 3 shows an example of mass spectrum data, which is obtained by multiple-stage dissociation and mass spectrometry for a parent ion. Mass spectrometry is performed for the parent ion after collision induced dissociation and MS.sup.2 mass spectrum data of dissociated ions is obtained. Among mass peaks observed in MS.sup.2 data, the highest one is picked up and a mass to charge ratio (hereinafter referred to as m/Z) corresponding thereto is selected as an m/Z value for determining a precursor ion. Subsequently, the precursor ion undergoes collision induced dissociation and mass spectrometric data is obtained, which is called MS.sup.3 data. Similarly, it may be possible to select a precursor ion which has the highest mass peak in MS.sup.N data and proceed to the following stage of dissociation and mass spectrometry. This approach can provide an MS.sup.N spectrum of high ionic strength to be used as mass spectrometric data at the following stage. It may also be possible for a user to select a precursor ion at each stage and start the following dissociation and mass spectrometry for the selected precursor ion. In this way, multiple-stage dissociation and mass spectrometry according to the steps described above provides the in-depth information on partial structure for a precursor ion, thereby enabling accurate estimation for structure of a parent ion.

A method according to the present invention for analyzing a parent ion as well as a precursor ion is described, which utilizes mass spectrometric data 1 (MS.sup.N N≧3) obtained by multi-stage dissociation and mass spectrometry for the parent ion.

Figure 4:
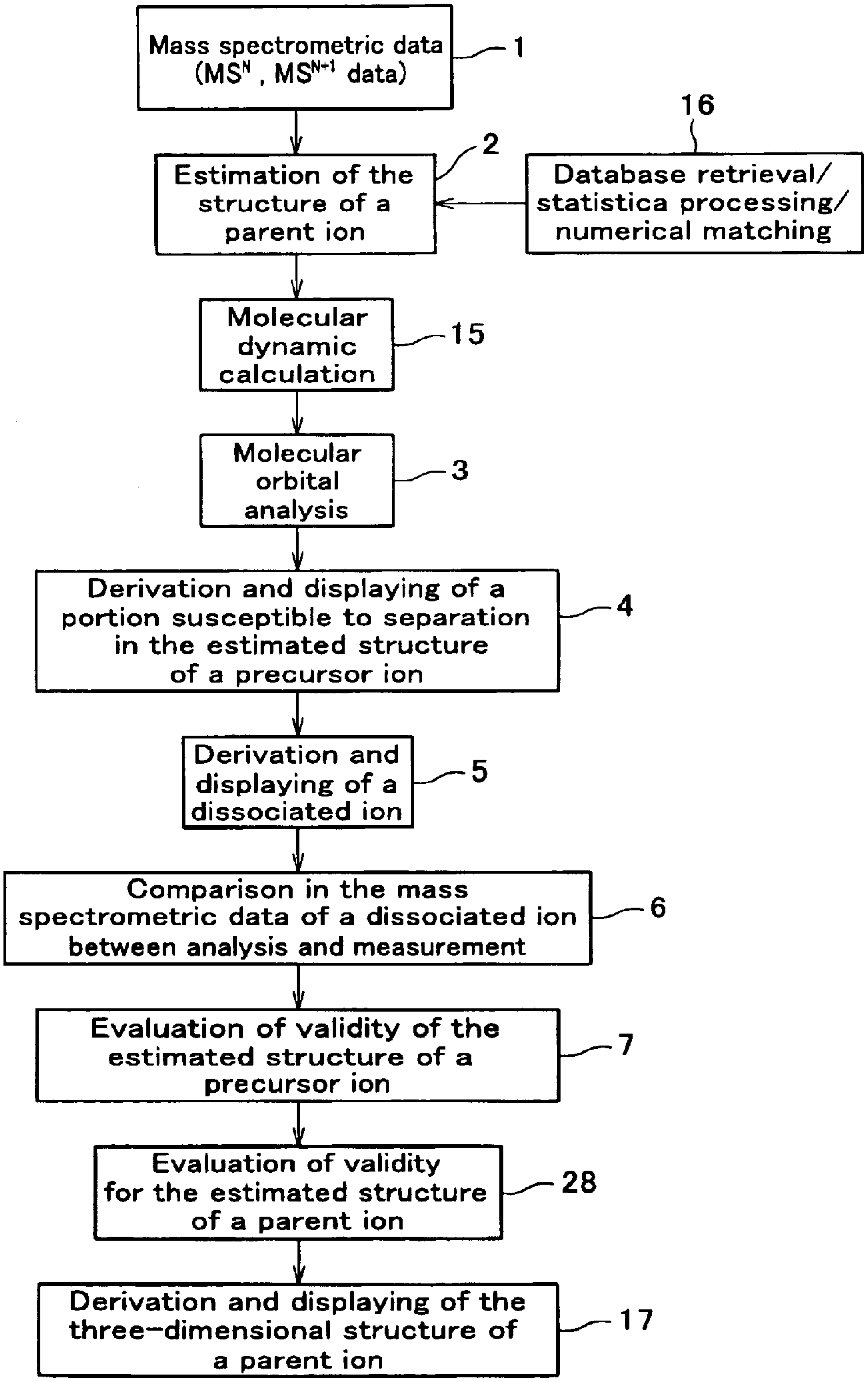
FIG. 4 is a flow diagram showing a method of analyzing mass spectrometric data according to a first embodiment, when a parent ion is a high polymer such as a peptide or sugar chain.

First, an initial estimation of structure is made for a parent ion. One of the following may be applied to the initial estimation. One is intuitional estimation made by a user. Another one is rough estimation made by a user based on mass spectrometric data (MS.sup.1 and MS.sup.2 data) for a parent ion and dissociated ions thereof as shown by a dotted line in FIG. 1. The other one is estimation derived by processing with software which lists up candidates for the structure of a parent ion, such as a step 16 for estimation using database search, statistical processing or numerical matching shown in FIG. 4, based on the mass spectrometric data (MS.sup.1 and MS.sup.2 data). The data search, which is able to provide relatively higher accuracy of estimation among the techniques in the conventional estimation method of step 16, has limitation for accuracy in estimating the structure of a parent ion, because the database used for data search does not include mass spectrometric data MS.sup.N (N≧3). The numerical matching, which has difficulty in distinguishing amino acids having the same mass number, does not provide high accuracy, either. The present invention, which introduces a step 3 for molecular orbital analysis shown in an analysis flow of FIG. 1, calculates thermal, chemical and energy related characteristics for the candidates for structure of a parent ion estimated by the conventional estimation method of step 16. In this connection, when the parent ion is a high polymer such as a peptide or sugar chain, it will be possible to provide higher accuracy if the thermal, chemical and energy related characteristics are calculated after optimization made by a step 15 of molecular orbital calculation shown in a flow of FIG. 4 for the structure of parent ion. A portion susceptible to separation within estimated structure of a precursor ion is displayed at a step 4 based on the thermal, chemical and energy related characteristics. Dissociated ions to be produced, which are estimated based on the thermal, chemical and energy related characteristics, are derived and displayed at a step 5. At a step 6, comparison is made between the data of dissociated ions obtained by a molecular orbital analysis at the step 3 and the mass spectrometric data of actual dissociated ions. Subsequently, the validity of estimated structure of precursor ion is evaluated at a step 7. At the steps 1 through 7, the steps are repeated according to the number of mass spectrometric data when N is equal to or greater than 3 for MS.sup.N data (MS.sup.N N≧3). In this way, the estimated structure of a parent ion is finally evaluated accurately at a step 8 by analyzing MS.sup.N data N≧3.

Figure 5:
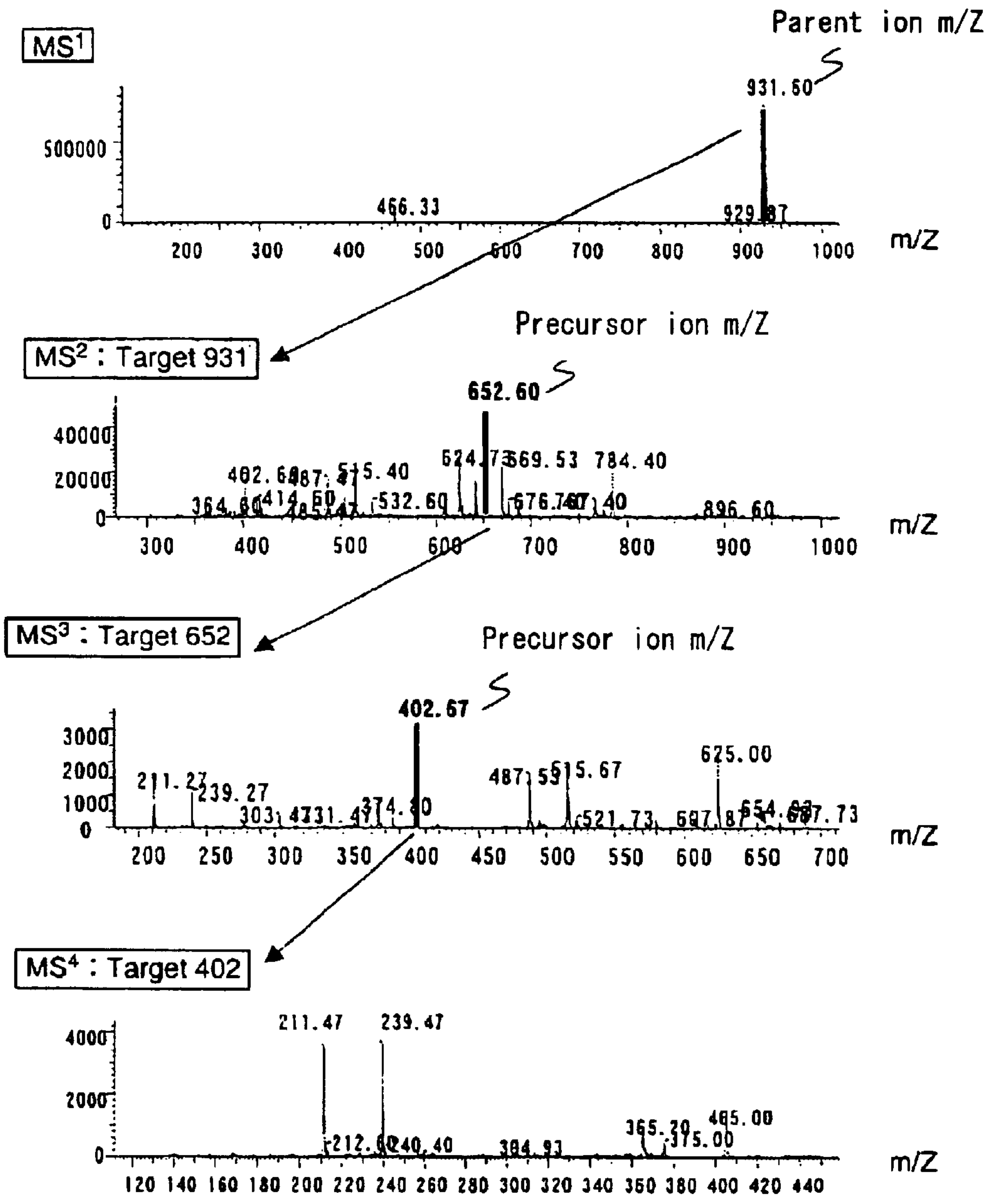
FIG. 5 is a diagram showing an example of mass spectrum data resulting from tandem mass spectrometry for a peptide (Angiotensin III)
Figure 6:
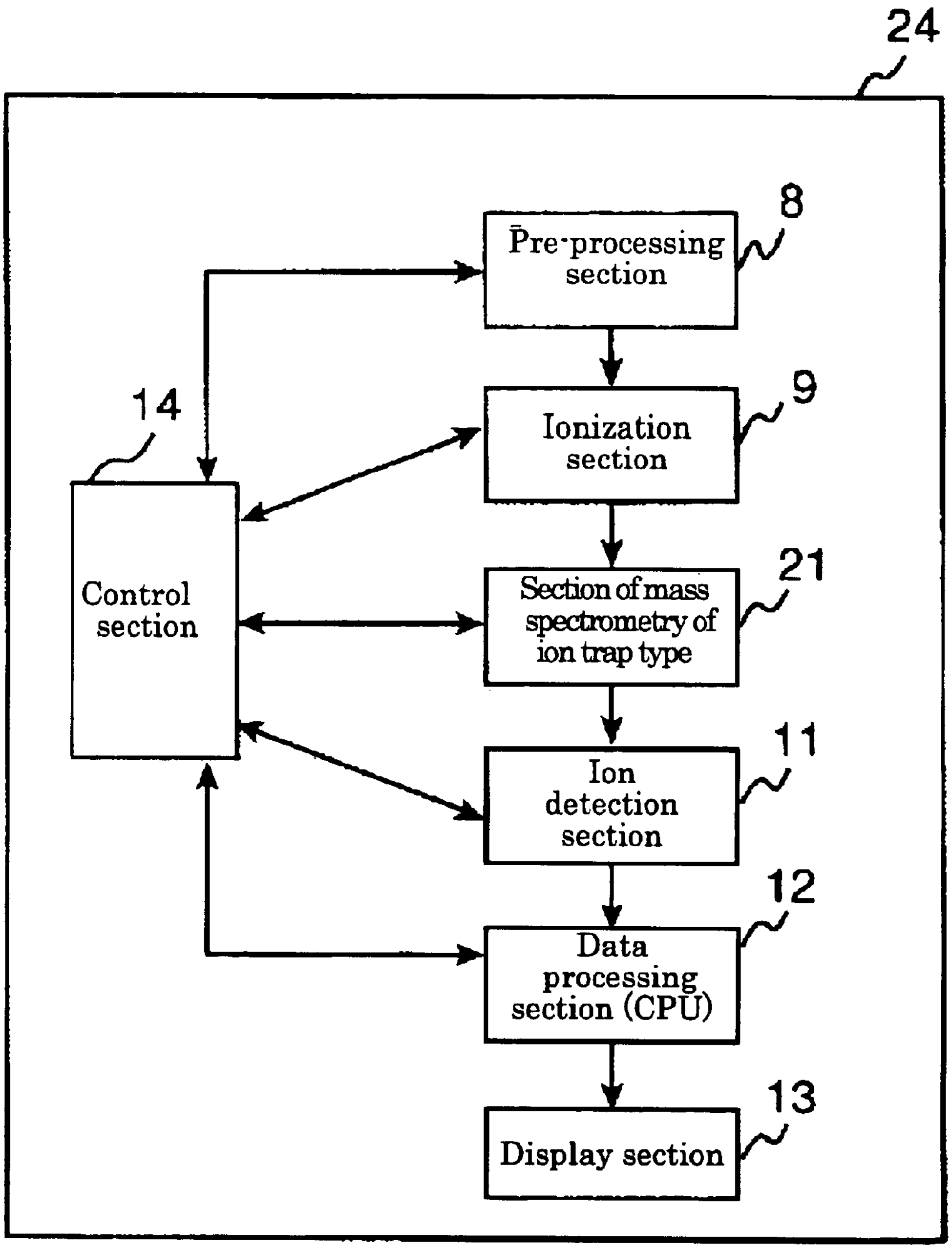
FIG. 6 is a diagram illustrating an apparatus for mass spectrometry used for measurement of mass spectrometric data shown in FIG. 5.

Steps and contents of analysis according to the present invention are described in detail referring to FIGS. 5–7. FIG. 5 is a diagram showing analytical results obtained by tandem mass spectrometry for a peptide (Angiotensin III). In this connection, it is noted that a section 21 for ion trap mass spectrometry is used in the measurement in place of a mass spectrometric section 10, as shown in FIG. 6. At the section 21 only a precursor ion is trapped which is selected according to the masses. By superimposing a Collision Induced Dissociation (CID) electric field, having a frequency with which a parent ion is resonant, on an ion trap electric field, the precursor ion is dissociated colliding repeatedly with a neutral gas filled in the section 21. The dissociated ions are separated according to the masses in the section 21 and therefore mass spectrometric data 1 is obtained for the precursor ion (including the parent ion) and dissociated ions. In this way, the section 21, which serves as both collision cell 10A and mass spectrometric section 10, allows downsizing of an apparatus 24 for mass spectrometry.

Description is given for steps for analyzing MS and MS.sup.N data obtained this way. The structure of a parent ion is estimated initially based on either MS data shown in FIG. 4 or MS.sup.2 data for the dissociated ions of parent ion. In the present embodiment, a technique of numerical matching is selected for the method for initial estimation of a parent ion. In this method an analysis is conducted in the following steps. All the possible combination for an amino acid is estimated according to an m/Z at which MS.sup.1 of a parent ion takes a mass peak. Subsequently, estimated one-dimensional structure, namely amino acid sequences are listed up, taking into account the degree of coincidence between a delta m/Z representing a mass interval between mass peaks of MS.sup.2 data and a mass to charge ratio (m/Z) of an amino acid. FIG. 7 shows an example of the analysis, which lists up similar sequences in terms of structure. Since leucine (Leu) and isoleucine (Ile) of amino acids have the same mass number but different structure, the method fails to distinguish them and provides almost same ranking for them as shown in FIG. 7. The correct amino acid sequence for a peptide (Angiotensin III) is given ranking of 20, which suggests that the method introducing initial estimation has limitation of accuracy in estimating the structure of a parent ion.

In the present embodiment, a molecular orbit such as a highest occupied molecular orbit (HOMO) or lowest unoccupied molecular orbit (LUMO) is calculated for thermal, chemical and energy related characteristics, based on which the condition of bonding of a whole molecule is determined. HOMO, which is representative of a molecular orbit which is filled with electrons most densely, is an important factor to be helpful for analyzing a thermochemical reaction. On the other hand, LUMO, which is representative of a molecular orbit filled with electrons most scarcely, is an important factor to be helpful for analyzing a reaction which occurs in a somewhat higher energy level than that of a thermochemical one. Calculation of these HOMO and LUMO makes it feasible to provide difference in dissociation characteristics according to the dissociation energies. Since an example described in the present embodiment corresponds to low energy dissociation, HOMO is calculated for each candidate of structure and the rate of coincidence between a location HOMO appears and an actual location a precursor ion actually dissociates. Subsequently, another round of ranking is made according to the calculation, the results of which are shown in the right-end column of FIG. 8. On the table the correct amino acid sequence is ranked first. It may be possible to select another type of identification such as percentage of reliability or reliability levels with symbols A, B and C as a method for displaying at a step 7 for evaluating the validity of estimated structure of a parent ion instead of ranking described above.

Figure 9:
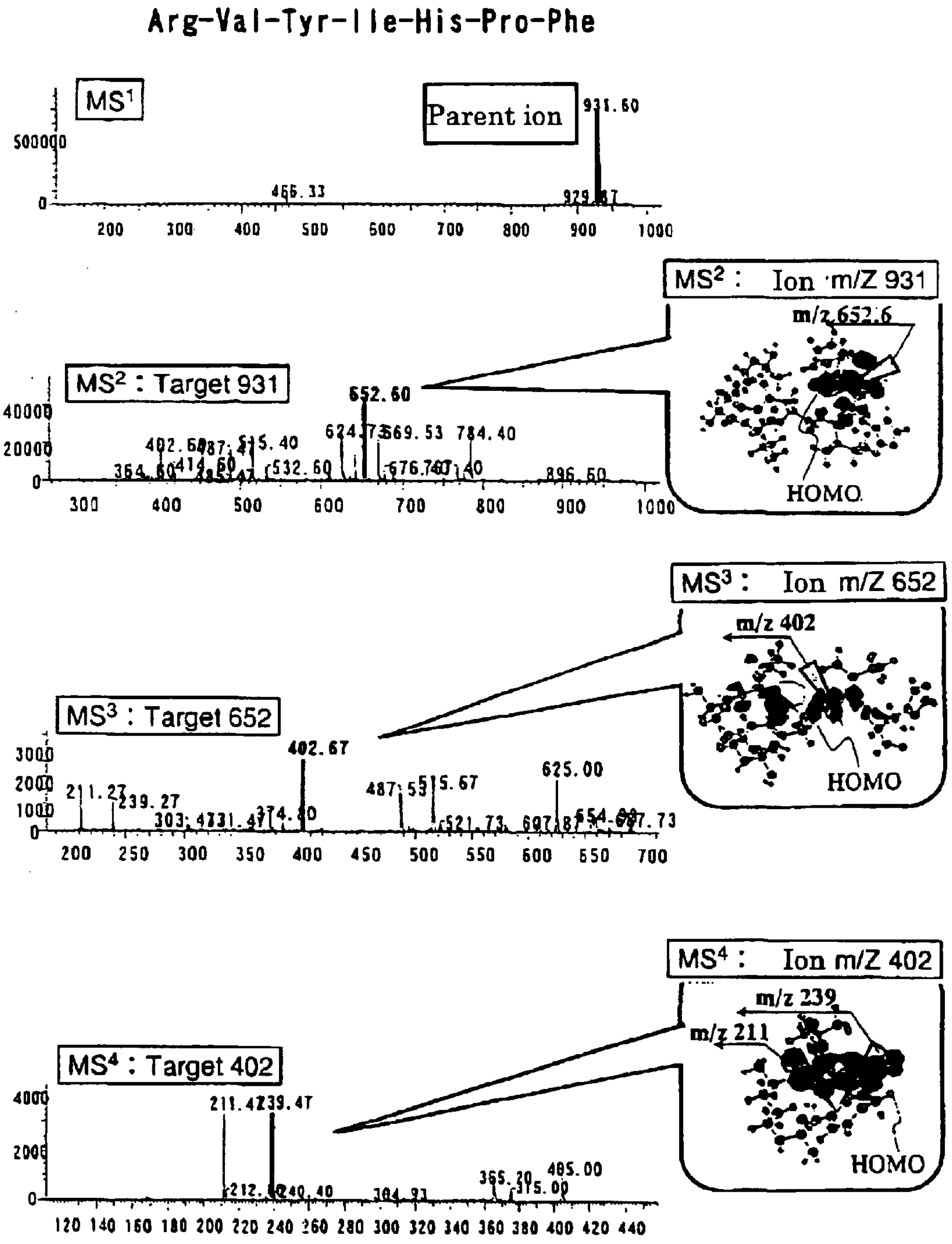
FIG. 9 is a schematic diagram showing highest occupied molecular orbit (HOMO) which is selected as a method for displaying characteristics obtained by molecular orbital analysis according to a first embodiment.

The method according to the present embodiment, which is able to analyze susceptibility to separation of dissociated ions, namely intensity of MS spectrum for the dissociated ions, enables high accuracy in estimating the structure of a parent ion. The results of HOMO calculation for a precursor ion at each dissociation stage is shown in FIG. 9 for the correct amino acid sequence. For example, if the method has a step 17 able to display estimated structure three-dimensionally on a list shown in FIG. 8 on request by a user, it will be helpful for analyzing the validity of estimated structure. As shown in FIG. 9, if the step 17 also has a function for displaying the structure of a precursor ion and a location of HOMO appearance at each dissociation stage, it will be more beneficial for a user to understand ranking.

It may be possible to display only the results of a step 7 for evaluation of validity of the estimated structure of a parent ion, without displaying intermediate results obtained at a step 3 for molecular orbital analysis as well as a step 4 for providing and displaying a portion susceptible to separation of the estimated structure of a precursor ion. However, it is necessary to give notice that the results are obtained through a thermal, chemical and energy related calculation. It may be possible to add a function to store the results of thermal, chemical and energy related calculation so that a user can access to them or to display them if he requires.

The present embodiment, which is able to estimate structure of a dissociated ion and a precursor ion for mass spectrometric data (MS.sup.N N≧3) for which a database is not available introducing thermal, chemical and energy related calculation, can evaluate the validity of structure estimated in advance for a parent ion. In this way, it provides a tool for estimating structure of a parent ion or a precursor ion at each dissociation stage accurately.

A computer program, which executes the analytical steps in a system for analyzing mass spectrometric data according to the present invention, may be installed in a data processing section 12 of an apparatus 24 for mass spectrometry so that an analysis of mass spectrometric data can be performed on-site. Alternatively, the computer program may be installed in a separate computer.

Figure 10:
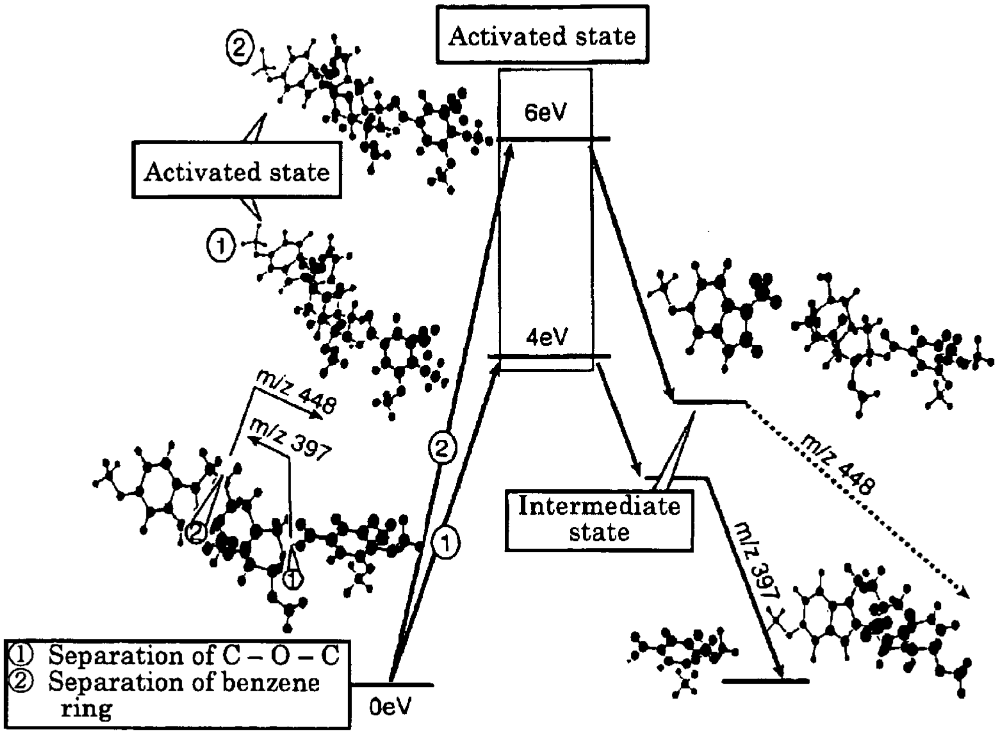
FIG. 10 is a diagram illustrating an example of activation energy obtained by molecular orbital analysis and displaying thereof according to a second embodiment.
Figure 11:
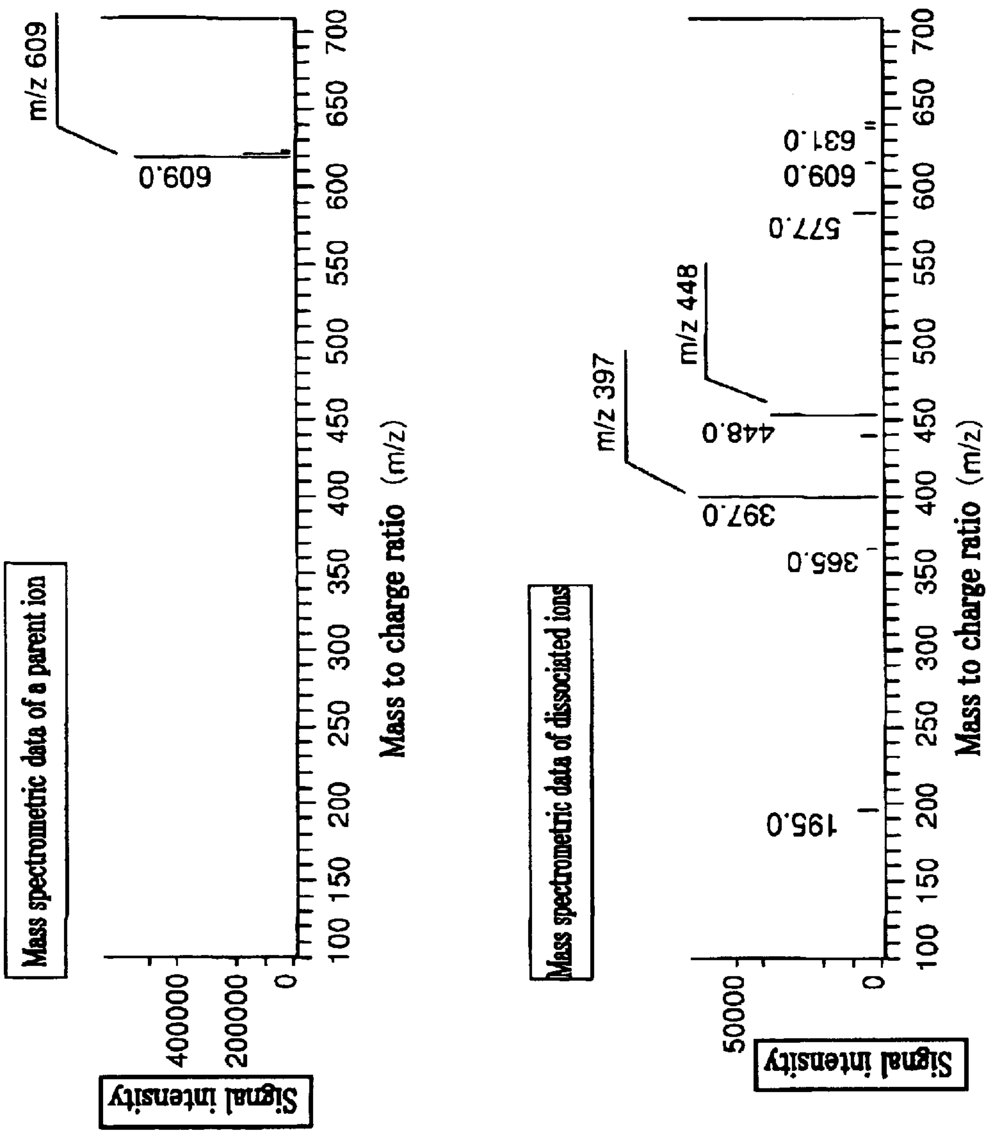
FIG. 11 is a diagram showing measured mass spectrometric data for a recerpine.
Figure 12:
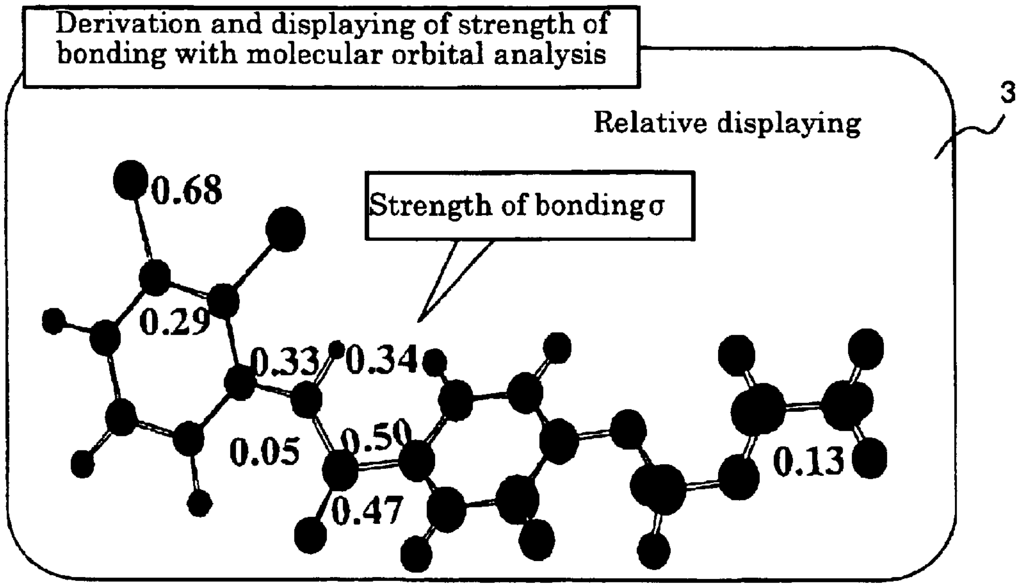
FIG. 12 is a diagram illustrating an example of parameter associated with bonding strength obtained by molecular orbital analysis and displaying thereof according to a second embodiment.

A second embodiment of the present invention is described referring to FIGS. 10–12. The second embodiment has a feature that a parameter associated with strength of bonding, activation energy and dissociation energy are calculated and displayed, in addition to a molecular orbit calculated by a step 3 for molecular orbital analysis as thermal, chemical and energy related characteristics. When a parent ion experiences collision induced dissociation with a neutral gas such as helium gas, the parent ion transits to an activated state as shown in FIG. 10, which is considered to be a stable state of dissociated ion. FIG. 10 shows the energy required for transition to an activated state (activation energy) calculated by the step 3 for a sedative called recerpine. As shown in FIG. 10, the activation energy differs from a dissociated ion species to another and it is considered that a dissociated ion having smaller activation energy is more easily dissociated. In the case of recerpine, the activation energy of a dissociated ion having a mass-to-charge ratio m/Z of 397 amu is about 4 eV and that of the other dissociated ion having m/Z of 448 amu is about 6 eV. The results of molecular orbital analysis at the step 3 indicate that the dissociated ion having m/Z of 397 amu is more easily dissociated. Measured MS data for recerpine having m/Z of 609 amu and MS.sup.2 data for the dissociated ions thereof are shown in FIG. 11. The results obtained by molecular orbital analysis meet the measured data well. The measured data demonstrates that the intensity of spectrum signal of a dissociated ion having m/Z of 397 amu is higher than that of the other dissociated ion having m/Z of 448 amu, in other words the former is more easily dissociated than the latter. In this way, a molecular orbital analysis at the step 3, which calculates activation energy, can provide an accurate estimation for a dissociated ion.

Figure 13:
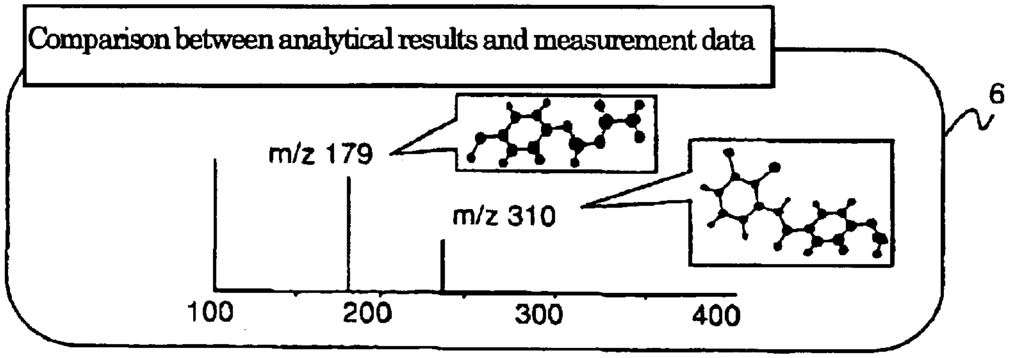
FIG. 13 is a diagram showing measured mass spectrometric data for an ETOBENZANID.
Figure 14:
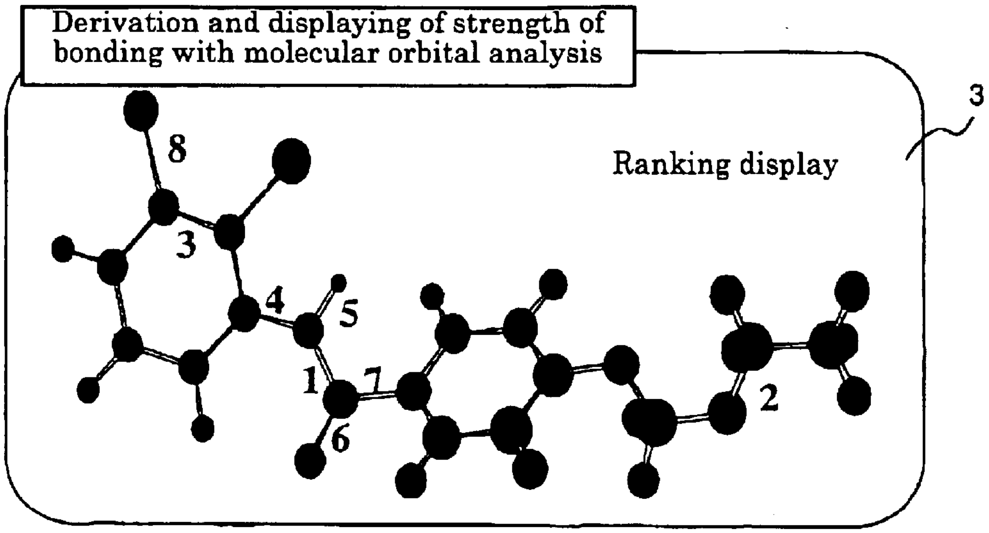
FIG. 14 is a diagram illustrating ranking of characteristics based on results obtained by molecular orbital analysis according to a third embodiment.
Figure 15:
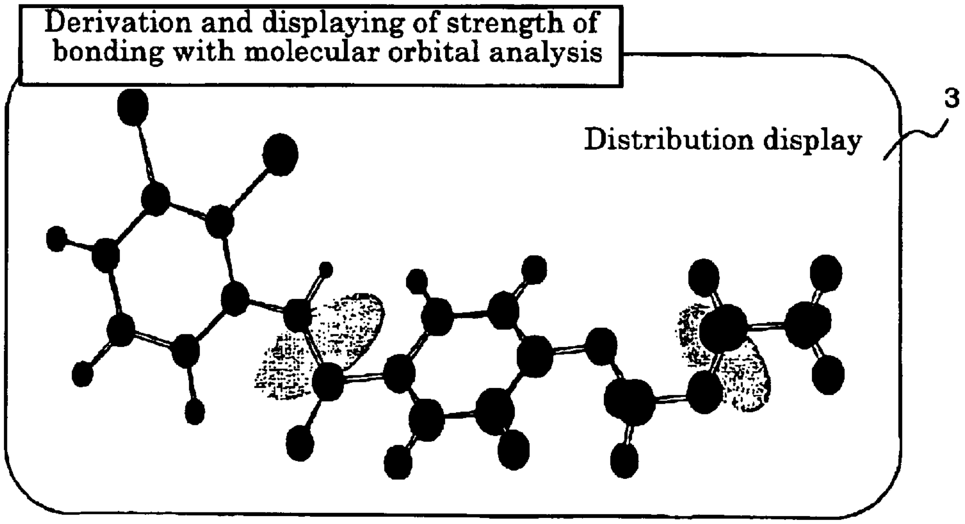
FIG. 15 is a diagram illustrating distribution of characteristics based on results obtained by molecular orbital analysis according to a third embodiment.
Figure 16:
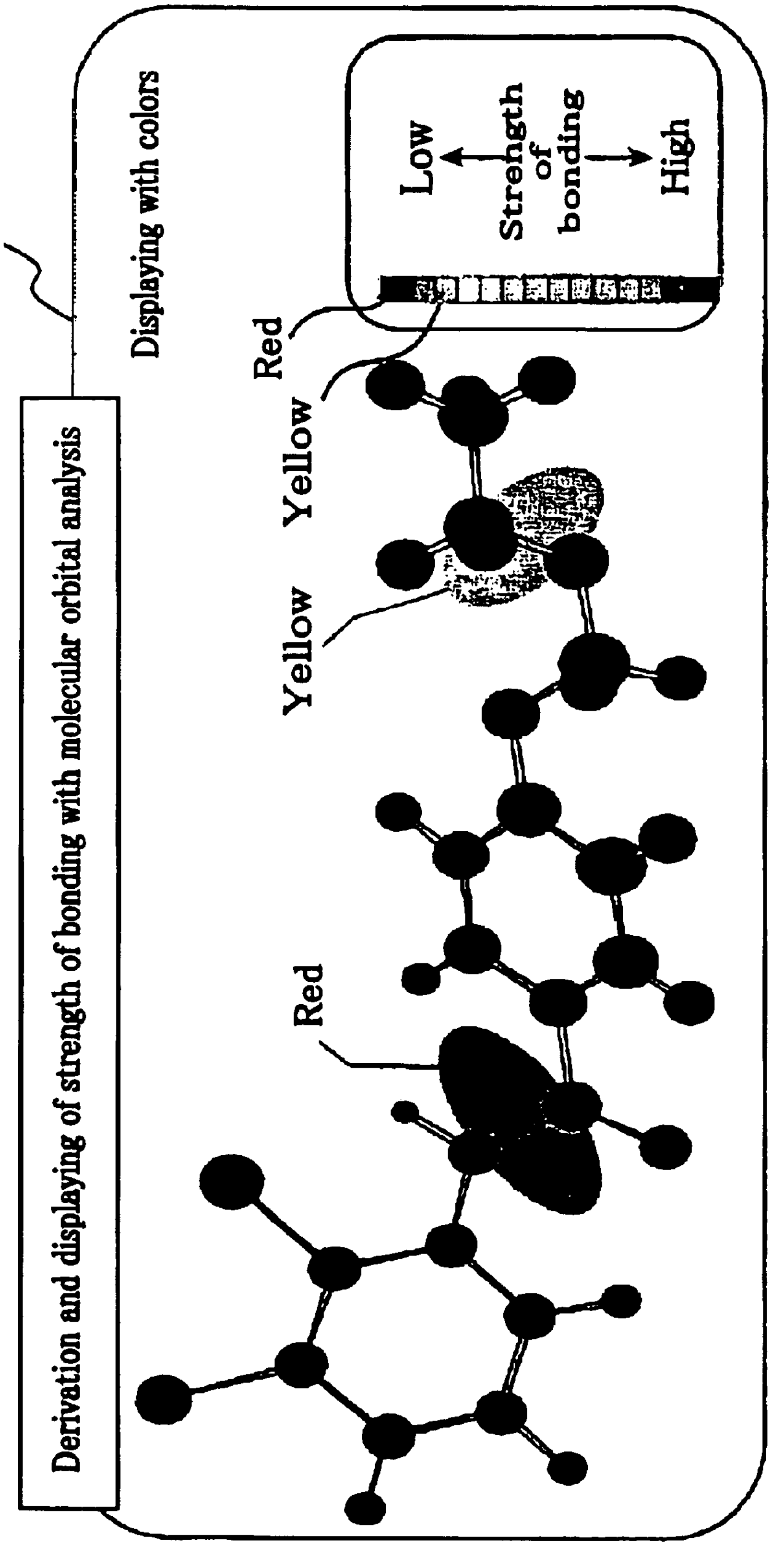
FIG. 16 is a diagram illustrating displaying of characteristics with coloring based on results obtained by molecular orbital analysis according to a third embodiment.
Figure 17:
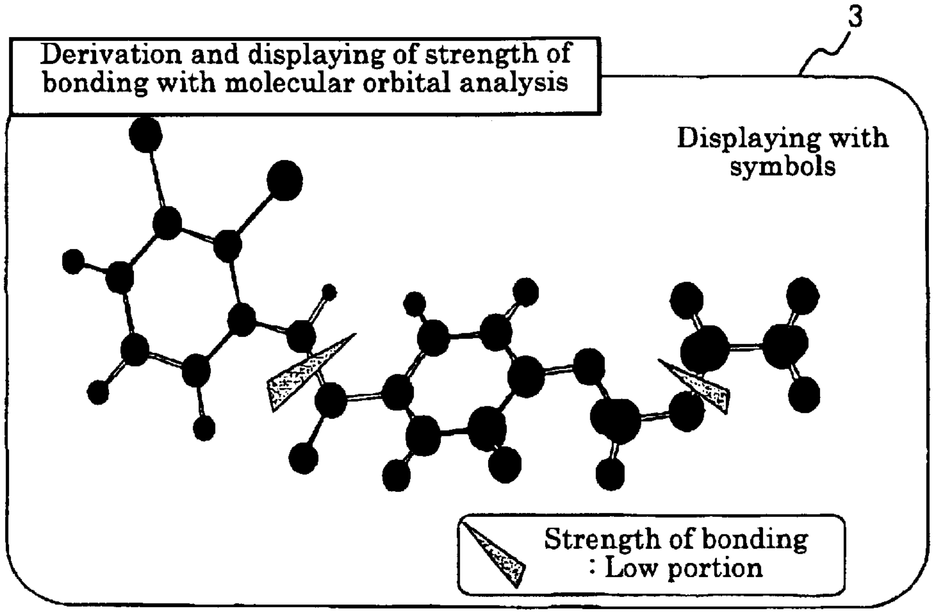
FIG. 17 is a diagram illustrating displaying of characteristics with symbols based on results obtained by molecular orbital analysis according to a third embodiment.

FIGS. 12 and 13 show an example of parameter associated with strength of bonding calculated by the step 3 as thermal, chemical and energy related characteristics. The parameter is defined as relative strength of bonding between a pair of atoms in a molecule. FIG. 12 shows an example of the parameter for an agricultural chemical called ETOBENZANID. It is considered that the smaller a parameter, the more easily dissociation occurs. Compared with the measured MS.sup.2 data for ETOBENZANID, it is known from the results of analysis shown in FIG. 12 that dissociation occurs at bonding having a smaller parameter. In this way, calculation of activation energy at the step 3 can provide accurate estimation for dissociated ions.

A third embodiment of the present invention is described referring to FIGS. 14–17. In this embodiment it is possible to select methods for displaying results calculated by a molecular orbital analysis at a step 3, other than displaying of relative parameter described in the second embodiment with FIG. 11. The methods include, displaying of ranking shown in FIG. 14, displaying of distribution shown in FIG. 15, displaying color gradation shown in FIG. 16 and displaying of symbols shown in FIG. 17. Also it is possible to select a combination with the methods shown in the first embodiment referring to FIG. 9, such as displaying of molecular orbit with distribution or coloring, or displaying of a portion susceptible to separation estimated from a molecular orbit with symbols. Numerical displaying of thermal, chemical and energy related characteristics tends to make it difficult for a user to search or evaluate the results, when a parent ion is composed of a large number of atoms. The present embodiment, which is able to provide visually the magnitude and strength of thermal, chemical and energy related characteristics, allows a beneficial tool for analyzing mass spectrometric data.

Figure 18:
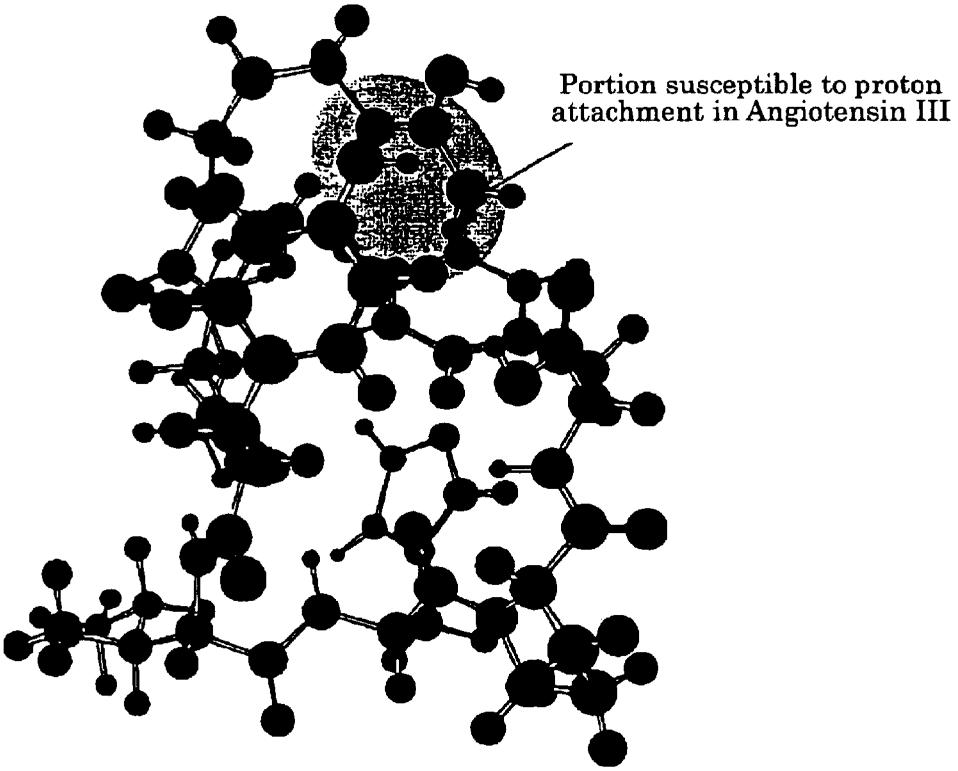
FIG. 18 is a diagram illustrating an example of a portion susceptible to proton attachment based on results obtained by molecular orbital analysis and displaying thereof according to a fourth embodiment.

A fourth embodiment of the present invention is described referring to FIG. 18. A molecular orbital analysis section at a step 3, which calculates a distribution of electrostatic potential, a distribution of neutral electric charge or a molecular orbit such as HOMO, is able to provide a portion susceptible to effect caused by ionization. For example, in the case of a positive ion, the step 3 provides a portion where a positive ion such as proton (H.sup.+), Na.sup.+ or Li.sup.+ is attached most easily. On the other hand in the case of a negative ion, the step 3 provides a portion where a proton is separated most easily. FIG. 18 shows an example of displaying of a portion, in which a proton (H.sup.+) is attached most easily. The present embodiment, which is able to estimate the structure of a parent ion in ionized condition and incorporate the effect on dissociation process, allows a more accurate determination of dissociated ion.

Figure 19:
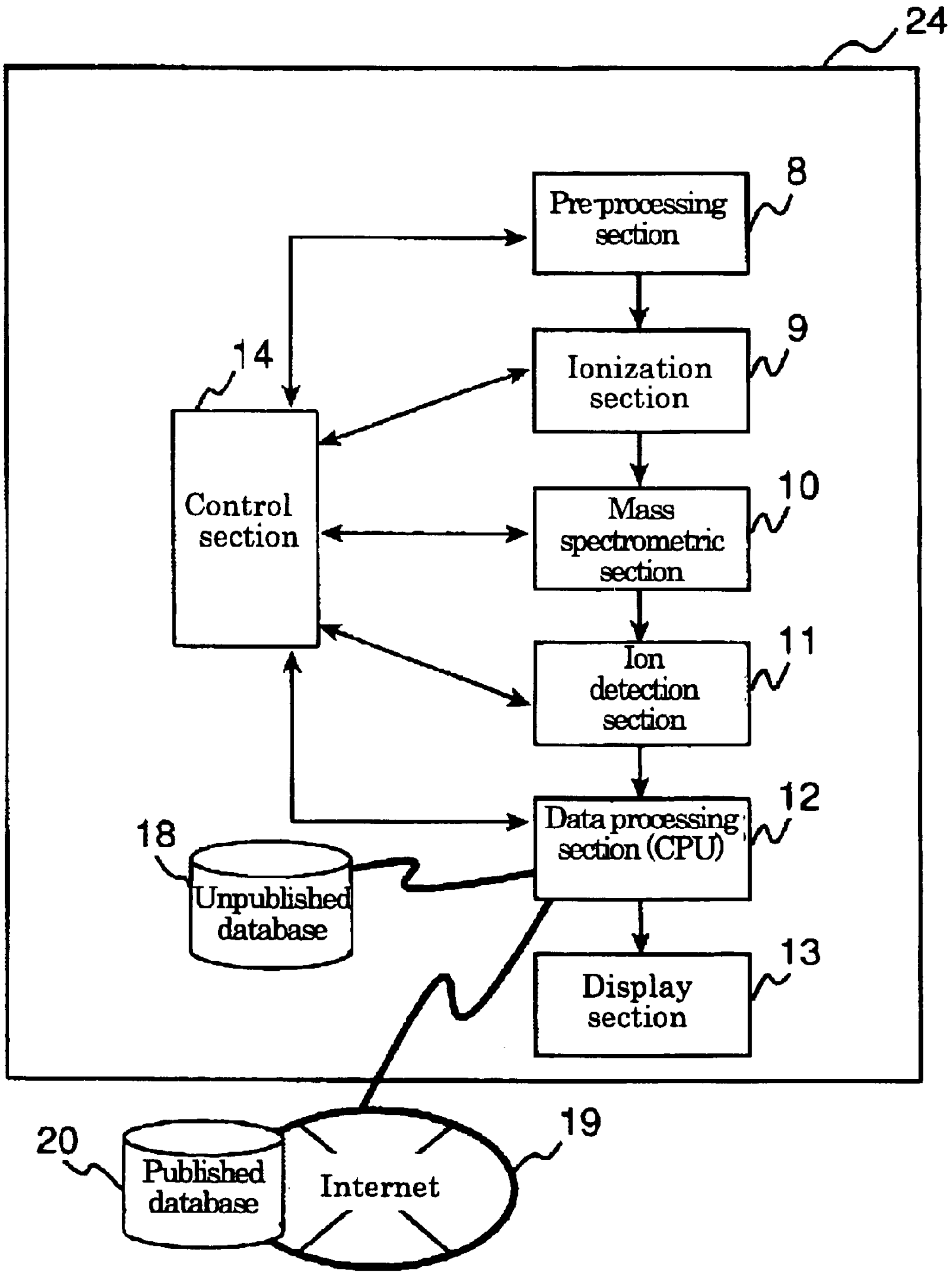
FIG. 19 is a schematic diagram showing an apparatus for mass spectrometry according to a fifth embodiment.
Figure 20:
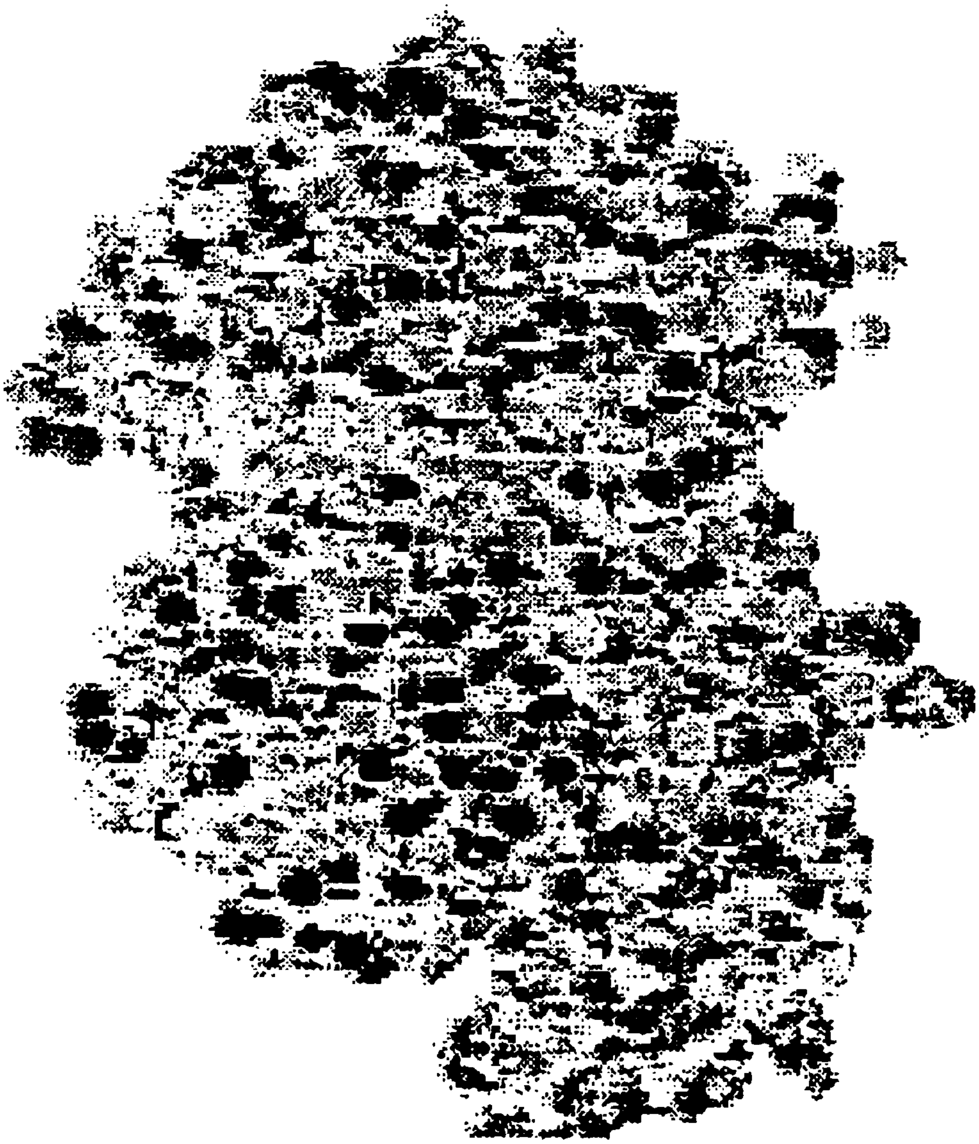
FIG. 20 is a diagram showing an example of displaying of the three-dimensional structure of a protein according to a fifth embodiment.

A fifth embodiment of the present invention is described referring to FIGS. 19 and 20. A method of the present embodiment searches a database for a sample, which contains a precursor ion of each dissociation stage in the structure thereof, and displays the structure of sample for parent ions, which are finally ranked high according to thermal, chemical and energy related characteristics obtained by a molecular orbital analysis at a step 3. An apparatus for mass spectrometry of the present embodiment is shown in FIG. 19. A data processing section 12 determines accurately the structure of a precursor ion at each dissociation stage and the structure of a parent ion before dissociation (the amino acid sequence of a peptide) according to mass spectrometric data after data reduction. The data processing section 12 retrieves an unpublished database 18 or published database 20 on an internet 19 for a protein which contains the precursor ion and parent ion in the sequence thereof, displaying an overall structure of corresponding protein as shown in FIG. 20. FIG. 20 shows a protein three-dimensionally, which is one of proteins hit by database search that include an amino acid sequence ranked first place finally by a molecular orbital analysis. It may be possible to display specifically a portion of the three dimensional structure which corresponds to the amino acid sequence by identifying with color. In this way, it is helpful for a user to conduct a functional analysis since the placement and function of amino acid sequence relative to the overall structure of a protein are clarified. Similarly, it is possible to display the finally estimated structure of a sugar chain three-dimensionally in the form of attachment to a protein with modification after analyzing the results obtained by multiple-stage dissociation and mass spectrometry for the modified structure of sugar chain. In this case, it is helpful for a user to analyze the role and function of modified structure in the whole structure of a protein, which is considered to be closely related to a disease.

When the capacity of an apparatus for mass spectrometry is limited to smaller molecules, the present embodiment allows searching of three-dimensional structure by database search using published or unpublished database for larger molecules such as protein and sugar chain, which include structure of parent ions of high ranking determined by a molecule orbital analysis at a step 3. The present embodiment enables displaying of the three-dimensional structure of a drug based on the results of mass spectrometry at low cost and high speed, thereby contributing greatly to efficient development of a drug.

Figure 21:
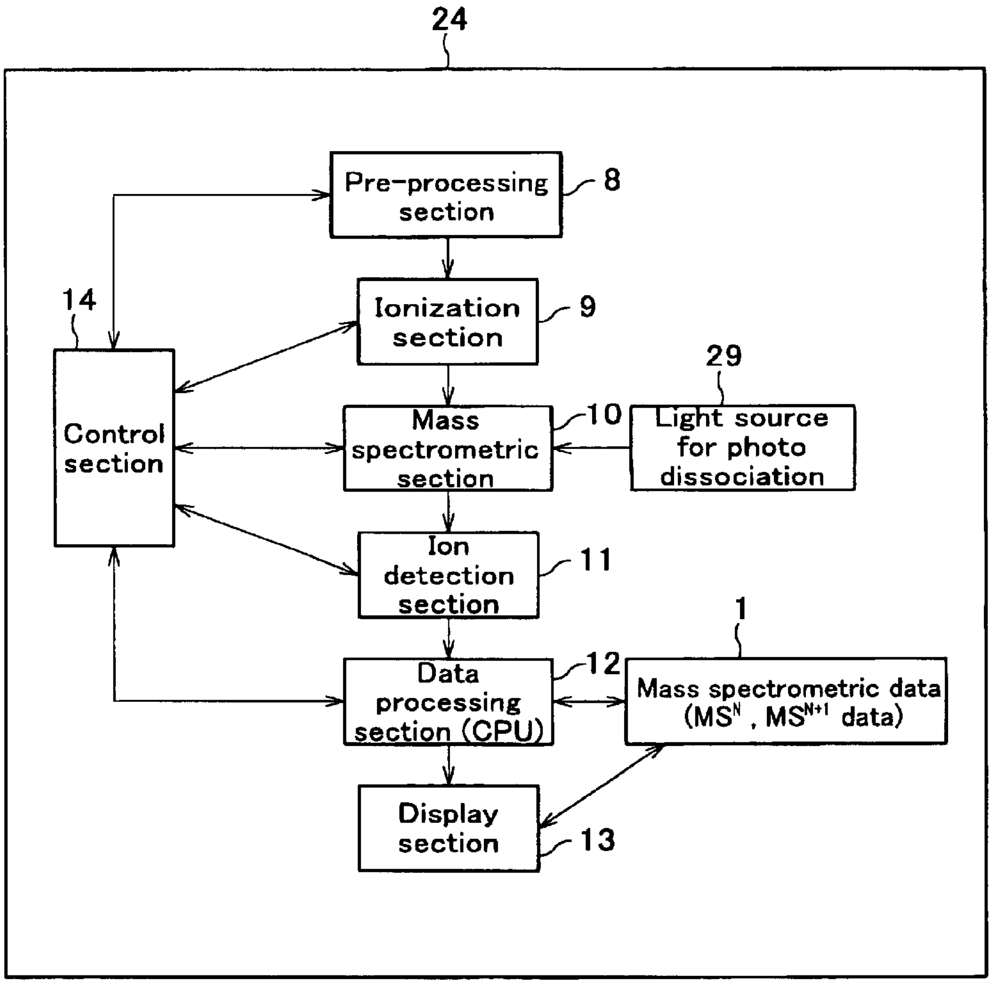
FIG. 21 is a schematic diagram showing an apparatus for mass spectrometry according to a sixth embodiment.

A sixth embodiment of the present invention is described referring to FIG. 21. This embodiment has a feature that photo dissociation is employed for multiple-stage dissociation of a parent ion. FIG. 21 is a block diagram illustrating an apparatus for mass spectrometry. In a photo dissociation method, the wave length of a light is adjusted according to the energy required for dissociation. For example, laser light is used for dissociation with high energy but infra red light is used for that with low energy. It is thus necessary to add a light source 29, which irradiates light for a mass spectrometric section 10. It is known that photo dissociation provides better dissociation efficiency than collision induced dissociation using a neutral gas. When a multiple-stage mass spectrometry is conducted, the higher stage dissociation reaches, the lower the resolution will be. However, the present embodiment, which increases the intensity of MS.sup.N spectrum data, improves the accuracy in analyzing the structure of a precursor ion and a parent ion.

Figure 22:
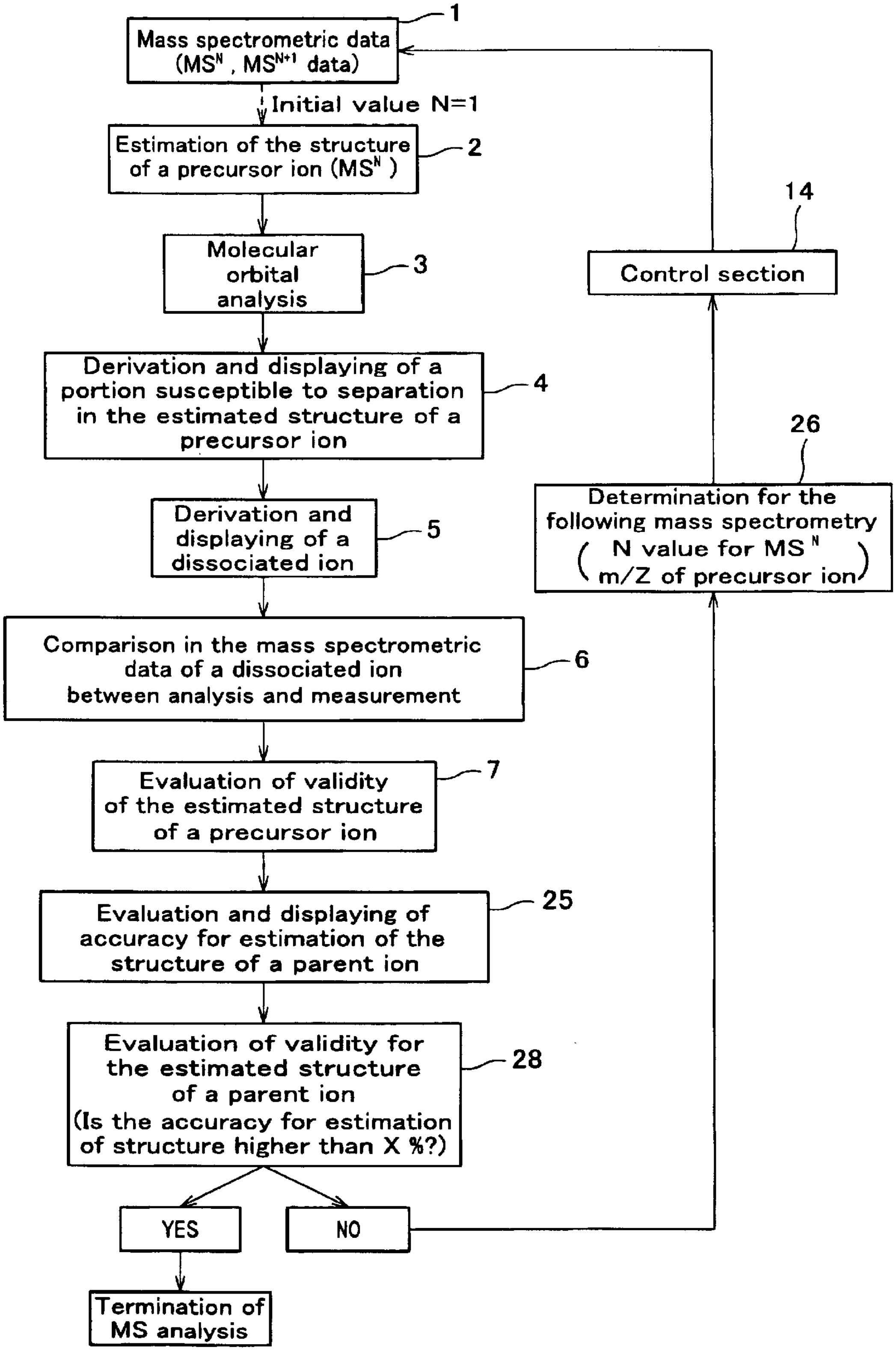
FIG. 22 is a flow diagram showing a method of analyzing mass spectrometric data according to a seventh embodiment.
Figure 23:
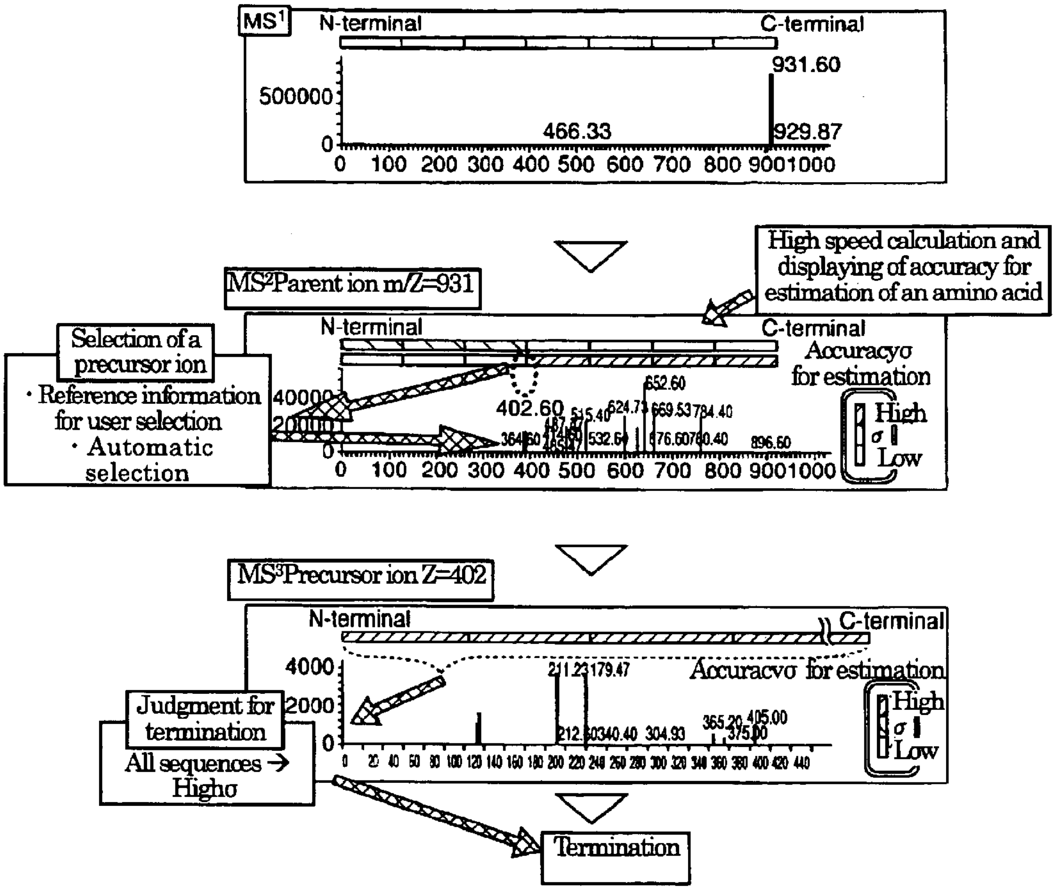
FIG. 23 is a diagram showing an example of analysis for mass spectrometric data according to a seventh embodiment.
Figure 24:
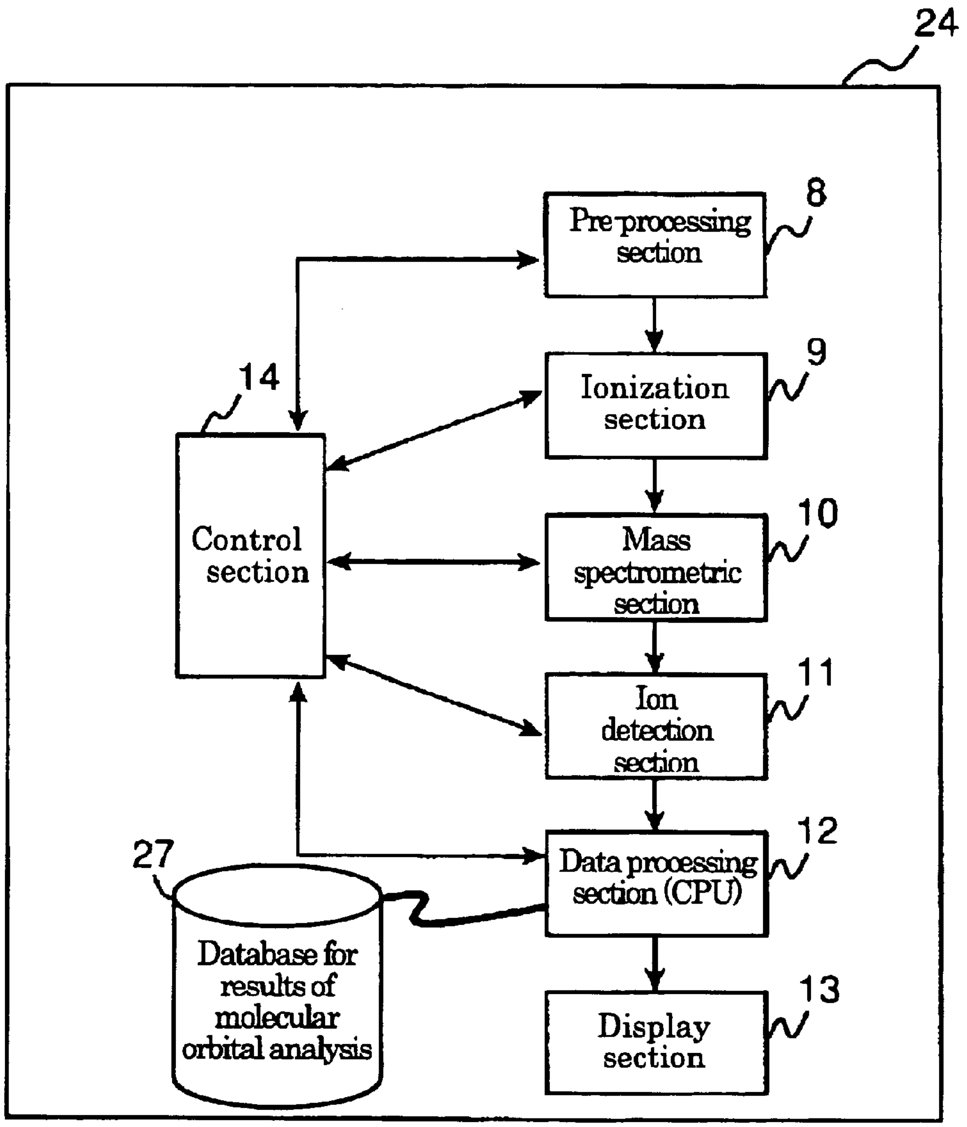
FIG. 24 is a schematic diagram showing an apparatus for mass spectrometry according to a seventh embodiment.

A seventh embodiment of the present invention is described referring to FIGS. 22–24. As shown in FIG. 22, an evaluation of accuracy for estimation of structure of a parent ion is executed at a step 25 after an evaluation of validity for the estimated structure of a precursor ion at a step 7. According to the results obtained at the step 25, an evaluation of validity for the estimated overall structure of a parent ion is conducted at a step 28. An N value for MS.sup.N for the following dissociation analysis and a mass to charge ratio m/Z of a precursor ion are determined at a step 26. At the step 26 a command for the following analysis is sent to a control section 14. In this way, an evaluation of the structure of precursor and parent ions is conducted for each mass spectrometry and the following analysis is determined according to the accuracy of estimation. Description is given in more details referring to FIG. 23. FIG. 23 shows an example of a peptide dissociated in multiple stages. At a stage when a parent ion undergoes mass spectrometry (the top diagram in FIG. 23), the accuracy associated with estimation of amino acid sequence is generally low since only the mass to charge ratio of a parent ion is obtained. An accuracy SIGMA estimated from the MS spectrum data is displayed in gradation on the upper part of a sheet. Light and dark represent low and high accuracy, respectively. It is possible to use an accuracy obtained by a molecular orbital analysis at a step 3 for the accuracy SIGMA. All the amino acid sequences are shown light for MS.sup.1 data for a parent ion. A bar showing an accuracy of estimation for amino acid sequence in FIG. 23 corresponds to a function conducted at a step 25 for evaluation and displaying of accuracy for estimation of the structure of a parent ion. At a stage of MS.sup.2 spectrum data obtained by the dissociation of parent ion (the middle diagram in FIG. 23), amino acid sequences occupying both ends have higher accuracy receiving support from the dissociated ion data, as shown by the bar in the upper part of diagram. Based on an m/Z, which is located at the boundary between the higher and lower accuracy for estimation of amino sequence shown in the bar, a precursor ion for the following dissociation analysis is selected. In this connection, a precursor ion may be selected automatically from the results of analysis for estimation accuracy of amino acid sequence. Also a user may select a precursor ion according to estimated accuracy displayed by a bar. At a step 28 for evaluation of validity for estimated structure of a parent ion, a judgment is made on whether the accuracy of estimation for the structure of a whole parent ion is high or low and a decision is made on whether or not the following mass spectrometry should be conducted. In this example shown in FIG. 23, a precursor ion, which has an m/Z of 402 amu, is selected for the following MS.sup.3 analysis and a command notifying the selection is sent to a control section 14 of an apparatus 24 for mass spectrometry. A mass spectrometric section 10 executes measurement after receiving a command from the control section 14. The mass spectrometric section 10 conveys measurement results, MS.sup.N data 1, to a data processing section 12 via the control section 14. The data is analyzed at the data processing section 12. Steps of analysis conducted in the data processing section 12 are shown in FIG. 22. The analysis is repeated until the accuracy of estimation for amino acid sequence reaches high in terms of an overall sequence (the structure of a parent ion) as shown by MS.sup.3 data in FIG. 23.

When mass spectrometry with multiple-stage dissociation is conducted repeatedly, an m/Z having the highest mass peak is usually selected as an m/Z for a precursor ion in the following dissociation analysis. The present embodiment, which is able to select an ion having lower accuracy of estimation for amino acid sequence as a precursor ion, can provide an efficient tool for analyzing the structure of a parent ion. However, when a molecular orbital analysis is executed at a step 3 to analyze accuracy of estimation for structure every time mass spectrometry is conducted, it is necessary to speed up the calculation. As one approach for it, a database 27 storing the results of molecular orbital analysis may be helpful, which are prepared for candidates for structure estimated in advance. In this way, it is possible to conduct an analysis by simple database search as accurate as that of the molecular orbital analysis performed at the step 3. In this connection, a database of measured MS and MS.sup.N dissociation data may be used instead of the database 27 storing the results of molecular orbital analysis. In this case, the intensity of mass peak would be criteria for searching for a portion susceptible to separation in an amino acid sequence. Therefore, the present embodiment, which is able to determine and control mass spectrometry in parallel with analyzing accurately the structure of an ion, can provide a tool which is capable of executing mass spectrometry with multiple-stage dissociation for a parent ion. It is also possible to relieve a user from load resulting from decision making for the following analysis in a complicated flow of multiple-stage mass spectrometry.

Figure 25:
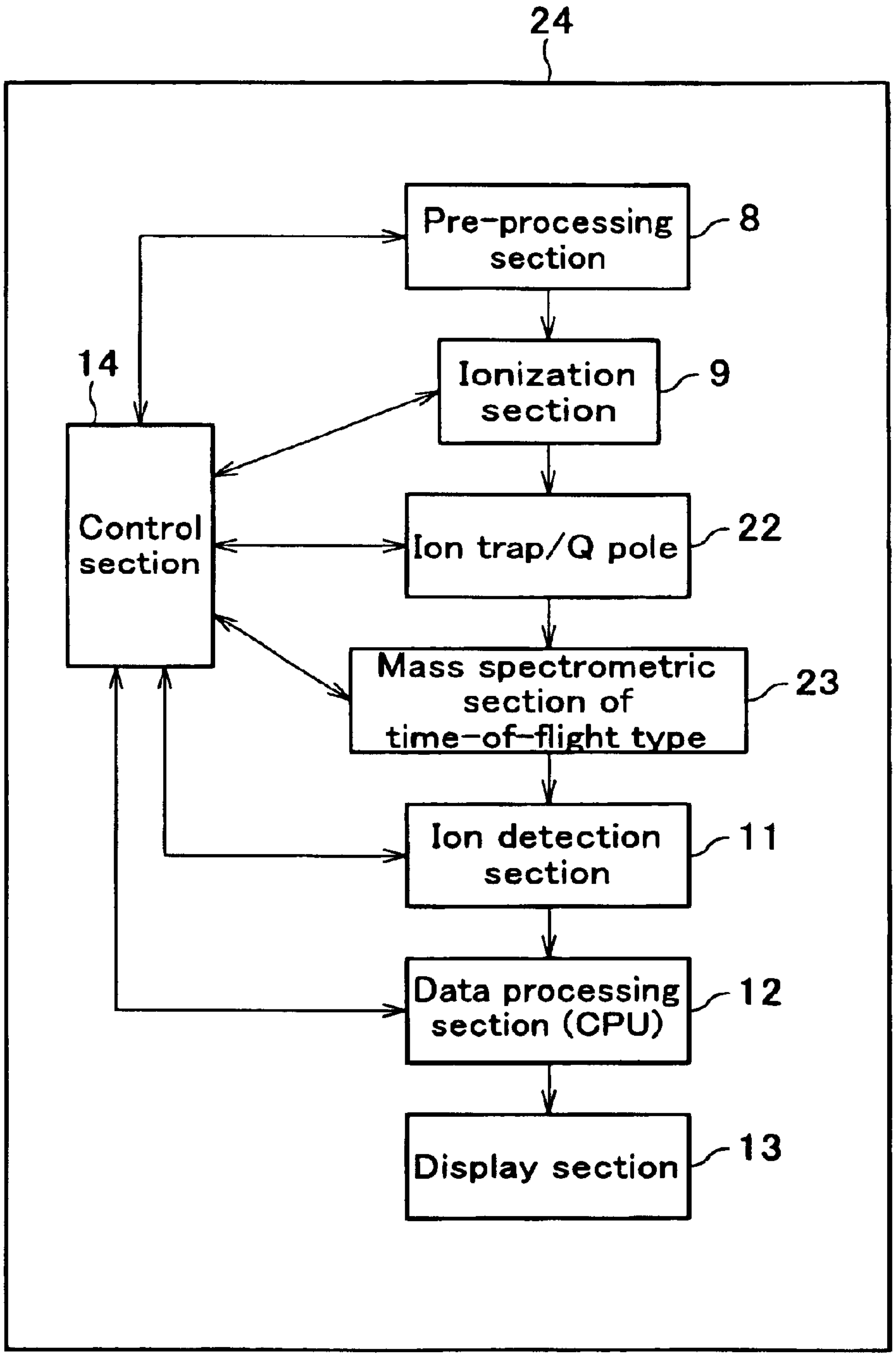
FIG. 25 is a schematic diagram showing an apparatus for mass spectrometry according to an eighth embodiment.

An eighth embodiment of the present invention is described referring to FIG. 25.

The embodiment has a feature that an ion trap 22 is adopted for a collision cell and a section 23 of mass spectrometry of time-of-flight type (also referred to as TOF) is adopted for a section of mass spectrometry. Or as an alternative, a Q pole 22 made of four-rod electrode can be adopted for a collision cell. An ion trap has a disadvantage that the upper limit for measurement of mass-to-charge ratio m/Z of a high polymer does not have flexibility. When an analysis is conducted for a biopolymer, the section 23 with TOF spectrometry, which is more suitable for analysis of high polymers, achieves better accuracy. Therefore, a method for analyzing mass spectrometric data of the present invention can be applied to an apparatus for mass spectrometry, which is prepared for the analysis of protein, peptide, sugar chain and the like. It is possible to estimate the structure of a parent ion accurately with molecular orbital analysis according to the data obtained by an apparatus for mass spectrometry of the present embodiment.

Figure 26:
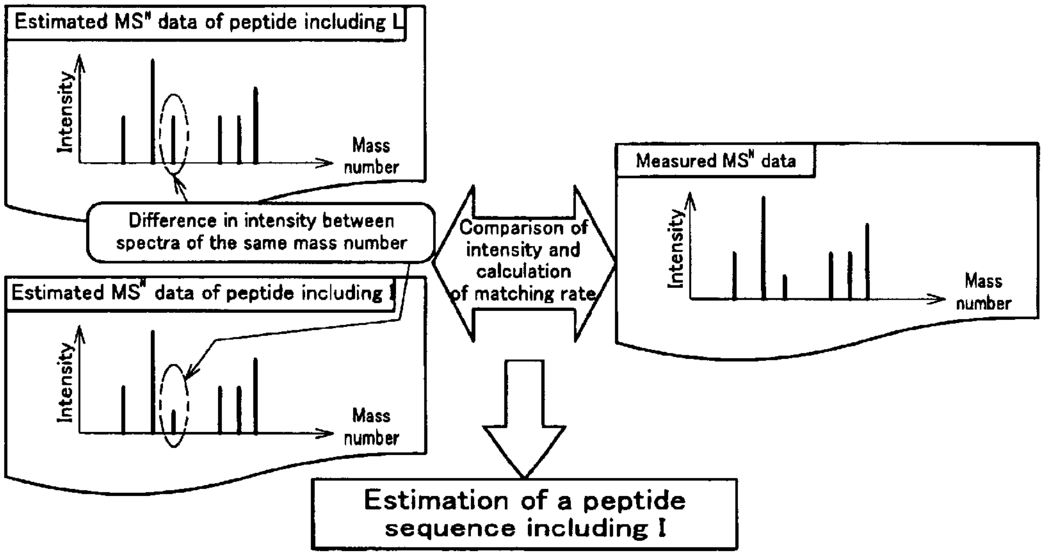
FIG. 26 is a diagram showing a method for estimating the structure of a precursor ion according to a ninth embodiment.

A ninth embodiment of the present invention is described referring to FIG. 26. The embodiment is tailored to analyze amino acids, leucine (L) and isoleucine (I) having the same mass number, which bring difficulty in identifying them based on mass spectrometric data of dissociated ions obtained by collision introduced dissociation of a precursor ion with low energy. The embodiment has a feature that if L or I is included in an amino acid sequence, which is estimated based on mass number data of mass spectrometric data (MS.sup.N N≧2) for dissociated ions, an estimation is made distinguishing L from I based on data of mass peak intensity. FIG. 26 shows a method of estimating the structure of a precursor ion according to the present embodiment. The amino acids L and I having the same mass number have different side chains, affecting the degree of susceptibility to separation of whole peptide bonding. A difference in intensity of the mass peaks of dissociated ions thus exists, to which no attention has been paid because the difference is usually small. The present embodiment directs attention to the difference to distinguish L from I. A method for implementing it is that one of molecular orbital calculation and molecular dynamic calculation is performed for L and I separately and susceptibility to dissociation is compared according to the calculation results. Subsequently, L and I are distinguished according to an intensity ratio of mass peak and comparison with the results of calculation.

An example of analysis is described below. Assume that a molecule orbital calculation is conducted for peptides YGGFLRKYP and YGGFIRKYP, and the results show that the peptide YGGFLRKYP has higher susceptibility to separation in terms of bonding between F and L, 1.6 times as that of the peptide YGGFIRKYP in terms of bonding between F and I. This leads to an assumption that a mass peak of ion resulting from separation between F and L is approximately 1.6 as high as that between F and I. Identification of L and I is made by judging how much better measured mass spectrometric data of dissociated ion meets either one of the calculation results.

Description has been made for the case of identifying amino acids L and I having the same mass number. As a matter of course the method can be applied to amino acids lysine (K) and glutamine (Q), which have substantially similar mass numbers.

It is possible to replace the result of molecular orbital calculation with measured data stored in a database, which includes data of mass peak intensity, and compare it with the measured mass spectrometric data of dissociated ion.

A tenth embodiment is described referring to FIG. 26. The embodiment is tailored to analyze an amino acid sequence which includes an amino acid having the same or similar mass number of a pair of amino acids. The embodiment has a feature that whether the amino acid sequence includes a pair of amino acids or a single amino acid is analyzed according to the measured mass spectrometric data (MS.sup.N N≧2), especially data of mass peak intensity. FIG. 27 is a list of amino acids, each of which has the same or similar mass number with a pair of amino acids. A pair of amino acids has been regarded as a single amino acid mistakenly when the amino acids are firmly bonded. The difference in structure between a pair of amino acid and a single amino acid has affect on susceptibility to separation of a peptide bonding. A method of the present embodiment is generally the same as that shown in FIG. 26. A difference in intensity of mass peak of a dissociated ion differs between a pair of amino acids and a single amino acid. The present embodiment, which directs attention to the difference, distinguishes the pair of amino acids from single amino acid. The susceptibility to dissociation is compared between them based on a molecular orbital calculation or molecular dynamic calculation conducted for the pair of amino acids and single amino acid, respectively. Subsequently, estimation for the structure of an ion is conducted distinguishing the pair of amino acids from single amino acid according to an intensity ratio of mass peak and comparison with the results of calculation.

As is the case with the ninth embodiment, it is possible to replace the result of molecular orbital calculation with measured data stored in a database, which includes data of mass peak intensity, and compare it with the measured mass spectrometric data of dissociated ion.

An eleventh embodiment is described. The embodiment is tailored for analyzing a modified peptide after translation and a modified portion after translation such as a sugar chain. It is difficult to estimate a monosaccharide based on mass number data of mass spectrometric data (MS.sup.N N≧2) of dissociated ions because a sugar chain is composed of isomeric monosaccharides having the same mass number (glucose, mannose, galactose and the like). An isomer having the same mass number which differs in structure has affect on susceptibility to separation of a peptide bonding. The embodiment has a feature that if there are isomeric candidates of the same mass number, the isomers are distinguished according to the measured mass spectrometric data (MS.sup.N N≧2), especially data of mass peak intensity. A method of the present embodiment is generally the same as that shown in FIG. 26. Namely, the method takes into account the fact that differences in intensity of mass peak of dissociated ions exist among the isomeric candidates. The present embodiment, which directs attention to the difference, identifies each isomer. The susceptibility to dissociation is compared among them based on a molecular orbital calculation or molecular dynamic calculation conducted for all the isomers. Subsequently, estimation for the structure of an ion is conducted distinguishing isomers according to an intensity ratio of mass peak and comparison with the results of calculation.

As is the case with the ninth embodiment, it is possible to replace the result of molecular orbital calculation with measured data stored in a database, which includes data of mass peak intensity, and compare it with the measured mass spectrometric data of dissociated ion.

What is claimed is:

1. A system for analyzing mass spectrometric data comprising:

an data input means for entering mass spectrometric data of a parent ion and dissociated ions resulting from multiple dissociation of the parent ion; and an analytical means for providing characteristics of a candidate for estimated structure of a precursor ion which is representative of pre-dissociation structure at each stage of dissociation, wherein the system analyzes one of the structure of precursor ion at each stage of dissociation and the structure of parent ion based on the characteristics and spectrometric data.

2. A system according to claim 1 wherein the data input means receives data resulting from the multiple dissociation of the parent ion.

3. A system according to claim 2 further comprising:

a validity judging means for judging validity of candidates for the parent ion after dissociation of a precursor ion;

a displaying means for displaying the validity; and a selection input means for entering selection for further dissolution.

4. A system according to claim 2 further comprising:

a validity judging means for judging validity of candidates for the parent ion after dissociation of a precursor ion, wherein the system determines specifics for further dissociation according to the validity.

5. A system according to claim 1 wherein the analytical means provides a portion susceptible to separation for the candidate for the estimated structure of the precursor ion and the system has a displaying means for displaying the portion.

6. A system according to claim 1 wherein the analytical means provides the candidate for the estimated structure of the precursor ion with a value associated with strength of bonding between atoms and the system has a displaying means for displaying the value.

7. A system according to claim 1 wherein the analytical means provides a value associated with strength of bonding between atoms and the system displays the value.

8. A system according to claim 1 wherein the analytical means provides the candidate for the estimated structure of the precursor ion with a value associated with susceptibility to attachment for one of a proton and a positive ion, and the system has a displaying means for displaying the value.

9. A system according to claim 1 wherein the analytical means provides the candidate for the estimated structure of the precursor ion with a value associated with molecular orbit.

10. A system according to claim 9 wherein the value provided by the analytical means is related to one of a highest occupied molecular orbit, a lowest unoccupied molecular orbit, a first peripheral molecular orbit of the highest occupied molecular orbit and a second peripheral molecular orbit of the lowest unoccupied molecular orbit, and the system has a displaying means for displaying the value.

11. A system according to claim 1 wherein the analytical means provides a value related to one of an electric charge distribution and an electrostatic potential for the candidate for the estimated structure of the precursor ion in a neutral condition, and the system displays the value.

12. A system according to claim 1 wherein the analytical means provides the characteristics of the candidate for the estimated structure of the precursor ion by introducing one of a molecular orbital calculation and a molecular dynamic calculation.

13. A system according to claim 1 further comprising a ranking means for providing ranking for the candidate for the estimated structure of the precursor ion based on the characteristics thereof obtained by the analytical means and the mass spectrometric data received by the data input means and wherein the system displays the ranking.

14. A system according to claim 1 further comprising a displaying means for displaying the characteristics of the candidate for the estimated structure of the precursor ion obtained by the analytical means, wherein the displaying means is adapted to display the characteristics utilizing one of distribution, colors, symbols and gradation.

15. A system according to claim 1 further comprising a structural search means for providing structure of a base attached to the precursor ion by modification, wherein the structural search means compares the characteristics of the candidate for the estimated structure of the precursor ion with the mass spectrometric data for the dissociated ions at each stage of dissociation, and wherein the system has a displaying means for displaying the structure of the base.

16. A system according to claim 15 wherein the displaying means is adapted to display both the estimated structure of the precursor ion and the structure of the base simultaneously.

17. A system according to claim 1, wherein the analytical means judges validity of the candidate for the estimated structure of the precursor ion, by comparing ionic strength of a dissociated ion having a peak value and measured ionic strength of the dissociated ion.

18. A system for analyzing structure of a compound comprising:

means for dissociating a parent ion;

means for entering mass spectrometric data for the parent ion and dissociated ions dissociated from the parent ion;

means for providing characteristics of a candidate for estimated structure of a precursor ion which is representative of pre-dissociation structure at each stage of dissociation, wherein the system analyzes one of the structure of the precursor ion at each stage of dissociation and structure of the parent ion according to the characteristics and mass spectrometric data.

19. A computer program for a computer of a system for analyzing mass spectrometric data, wherein the computer program executes the computer in a process comprising:

entering mass spectrometric data of a parent ion and dissociated ions resulting from multiple dissociation of the parent ion in an data input means; and providing characteristics of a candidate for estimated structure of a precursor ion which is representative of pre-dissociation structure at each stage of dissociation, wherein the computer program executes the computer to analyze one of the structure of precursor ion at each stage of dissociation and the structure of parent ion based on the characteristics and spectrometric data.

* * * * *